(12) United States Patent
Hills

(10) Patent No.: US 8,146,894 B2
(45) Date of Patent: Apr. 3, 2012

(54) APPARATUS FOR MIXING GASSES AND LIQUIDS

(76) Inventor: Blair H. Hills, Charleston, WV (US)

( * ) Notice: Subject to any disclaimer, the term of this patent is extended or adjusted under 35 U.S.C. 154(b) by 1286 days.

(21) Appl. No.: 11/668,816

(22) Filed: Jan. 30, 2007

(65) Prior Publication Data

US 2007/0200262 A1      Aug. 30, 2007

Related U.S. Application Data

(63) Continuation-in-part of application No. 11/157,652, filed on Jun. 21, 2005, now Pat. No. 7,398,963.

(60) Provisional application No. 60/763,257, filed on Jan. 30, 2006, provisional application No. 60/581,697, filed on Jun. 21, 2004.

(51) Int. Cl.
   *B01F 3/04* (2006.01)
(52) U.S. Cl. .................................. 261/86; 261/91
(58) Field of Classification Search ............ 261/84, 261/85, 86, 87, 91, 93, 120
   See application file for complete search history.

(56) References Cited

U.S. PATENT DOCUMENTS

| | | | |
|---|---|---|---|
| 2,063,301 A | 12/1936 | Durdin, Jr. | |
| 2,145,034 A | 1/1939 | Widdis | |
| 2,293,183 A | 8/1942 | Walker | |
| 2,515,538 A * | 7/1950 | Wall | 210/167.26 |
| 3,477,382 A * | 11/1969 | Watson | 415/207 |
| 3,532,327 A | 10/1970 | Landberg | |
| 3,606,273 A | 9/1971 | Johnson | |
| 3,630,498 A | 12/1971 | Bielinski | |
| 3,643,403 A | 2/1972 | Speece | |
| 3,677,528 A | 7/1972 | Martin | |
| 3,771,724 A | 11/1973 | Rose et al. | |
| 3,775,307 A | 11/1973 | McWhirter et al. | |
| 3,810,546 A | 5/1974 | Oxenham | |
| 3,846,516 A | 11/1974 | Carlson | |
| 3,856,272 A | 12/1974 | Ravitts | |
| 3,911,064 A | 10/1975 | McWhirter et al. | |
| 3,972,815 A * | 8/1976 | O'Cheskey et al. | 210/219 |

(Continued)

FOREIGN PATENT DOCUMENTS

EP      1 243 313 A2      9/2002

(Continued)

OTHER PUBLICATIONS

"Deep Tank Aeration with Blower and Compressor Considerations," Aeration: Principles and Practice, pp. 147-197, 2007.

(Continued)

*Primary Examiner* — Charles Bushey
(74) *Attorney, Agent, or Firm* — Alan G. Towner, Esq.; Matthew W. Gordon, Esq.; Pietragallo Gordon Alfano Bosick & Raspanti, LLP

(57) ABSTRACT

An apparatus for mixing gas and liquid is disclosed. The apparatus can comprise a draft tube having a gas conduit, a liquid inlet and a gas-liquid outlet, an impeller rotatably mounted within the draft tube. The gas can be entrained into the liquid by rotation of an impeller having relatively high angular velocity, which generates relatively low axial velocity of the liquid and relatively low angular velocity of the liquid. Floats may support the impeller and the impeller may have means for maximizing aeration of the liquid.

4 Claims, 36 Drawing Sheets

U.S. PATENT DOCUMENTS

| | | | |
|---|---|---|---|
| 4,064,403 A | 12/1977 | Miller | |
| 4,095,918 A | 6/1978 | Mouton, Jr. et al. | |
| 4,231,974 A | 11/1980 | Engelbrecht et al. | |
| 4,242,289 A | 12/1980 | Blum | |
| 4,341,641 A * | 7/1982 | Novak | 588/320 |
| 4,358,206 A | 11/1982 | Schutte | |
| 4,371,480 A | 2/1983 | Vos | |
| 4,459,030 A * | 7/1984 | Weetman | 366/262 |
| 4,465,645 A | 8/1984 | Kaelin | |
| 4,512,936 A | 4/1985 | Oshima et al. | |
| 4,519,715 A | 5/1985 | Golobic et al. | |
| 4,532,038 A | 7/1985 | Reid | |
| 4,571,090 A * | 2/1986 | Weetman et al. | 366/270 |
| 4,611,681 A | 9/1986 | Krude et al. | |
| 4,919,849 A * | 4/1990 | Litz et al. | 261/36.1 |
| 5,043,104 A | 8/1991 | Stirling | |
| 5,112,192 A | 5/1992 | Weetman | |
| 5,413,765 A | 5/1995 | Smith et al. | |
| 5,431,860 A | 7/1995 | Kozma et al. | |
| 5,525,269 A | 6/1996 | Connolly et al. | |
| 5,676,889 A | 10/1997 | Belgin | |
| 5,711,902 A | 1/1998 | Hsu | |
| 5,755,976 A | 5/1998 | Kortmann | |
| 5,785,899 A | 7/1998 | Young | |
| 5,874,003 A | 2/1999 | Rose | |
| 5,916,491 A | 6/1999 | Hills | |
| 5,921,745 A | 7/1999 | Round et al. | |
| 5,925,290 A | 7/1999 | Hills | |
| 5,996,977 A | 12/1999 | Burgess | |
| 6,017,020 A | 1/2000 | Baughman | |
| 6,024,623 A | 2/2000 | Menow et al. | |
| 6,077,424 A | 6/2000 | Katsukura et al. | |
| 6,135,430 A | 10/2000 | Bergman, Jr. et al. | |
| 6,145,815 A | 11/2000 | Cheng et al. | |
| 6,273,402 B1 | 8/2001 | Cheng | |
| 6,464,210 B1 | 10/2002 | Teran et al. | |
| 6,533,244 B1 | 3/2003 | Falkner | |
| 6,877,959 B2 | 4/2005 | McWhirter | |
| 7,083,324 B2 | 8/2006 | Van Drie | |
| 7,398,963 B2 | 7/2008 | Hills | |
| 7,644,909 B2 * | 1/2010 | Huhta-Koivisto et al. | 261/91 |
| 2005/0280167 A1 * | 12/2005 | Hills | 261/87 |
| 2007/0200261 A1 | 8/2007 | Hills | |

FOREIGN PATENT DOCUMENTS

| | | |
|---|---|---|
| FR | 2 798 602 A1 | 3/2001 |
| JP | 04197496 | 7/1992 |

OTHER PUBLICATIONS

"Surface and Mechanical Aeration," Aeration: Principles and Practice, pp. 199-240, 2007.

J. R. McWhirter et al., "Oxygen Mass Transfer Fundamentals of Surface Aerators," Ind. Eng. Chem. Res., vol. 34, No. 8, 1995, pp. 2644-2654.

* cited by examiner

APPARATUS FOR MIXING GASSES AND LIQUIDS

CROSS REFERENCE TO RELATED APPLICATIONS

This application claims the benefit of U.S. Provisional Patent Application Ser. No. 60/763,257 filed Jan. 30, 2006 and is a continuation-in-part U.S. patent application Ser. No. 11/157,652 filed Jun. 21, 2005, now U.S. Pat. No. 7,398,963 which claims the benefit of U.S. Provisional Patent Application Ser. No. 60/581,697 filed Jun. 21, 2004. All of these applications are incorporated herein by reference.

FIELD OF THE INVENTION

The present invention relates to gas and liquid mixers for use in various applications such as wastewater systems, chemical reactors, mass transfer systems and the like.

BACKGROUND INFORMATION

Gas-liquid mixing systems are conventionally used for many purposes, such as the mass transfer of gases into and/or out of liquids. Oxidation and reduction reactions often require that a gas, such as oxygen, chlorine or hydrogen, be mixed with liquids in the presence of solids. Unwanted gases dissolved in liquids can be stripped from the liquid by mixing a desired gas into the liquid. Direct contact heating of a liquid requires that a hot gas be mixed into a liquid, and, in some instances, the pH of a liquid can be adjusted by mixing a gaseous acid or base into the liquid.

For example, oxygen gas is often mixed with various liquids. Oxygen gas can be mixed with activated sludge to aerate waste material and assist in digestion, it can be used to oxidize carbon, sulfur and/or nitrogen containing material in a liquid, it can also be mixed with liquids containing organic compounds to oxidize the organic compounds into alcohols, aldehydes and acids, or it can be mixed with hydrometallurgical process liquids to achieve various desired effects. Oxygen gas can also be mixed with liquids to reduce nitrogen-containing compounds into nitroso-containing materials, nitrites and/or nitrates. Oxygen gas can be mixed with liquids to reduce sulfur-containing compounds into disulfides, sulfoxides and/or sulfates.

The formation of hydrogen sulfide can occur in any aquatic based system containing sulfates in which the dissolved oxygen does not meet the oxygen demand. Even small quantities of hydrogen sulfide can produce objectionable odors thereby necessitating that oxygen be mixed into the liquid. Industrial and municipal wastewater can also be treated by biological treatment techniques in which aerobic microorganisms convert contaminants into carbon dioxide gas and biomass. Sufficient oxygen must be provided to the aerobic organisms in order to carry out the necessary biological processes, chemical oxidation and/or fermentation processes.

Hydrogen gas can also be mixed with various liquids or liquid solid mixtures. For example, hydrogen gas can be used to saturate carbon-carbon double bonds and to reduce nitro and nitroso compounds in organic materials. Hydrogen gas can also be mixed into liquids present in vegetable oils processing, yeast production, vitamin C production, coal liquefaction, and the production of other types of unsaturated organic liquids. Chlorine gas can also be mixed with organic and inorganic liquids. Carbon monoxide gas can also be mixed with liquids containing organic compounds. In each of these examples, gas can be mixed into a liquid to dissolve and react with the liquid and/or liquid solid mixture to achieve various desired effects.

Conventional gas-liquid mixing systems can be typically classified as either surface aerators or diffused gas delivery systems. Diffused gas delivery systems that require gas compression typically comprise coarse, medium or fine bubble diffusers, liquid motive force venturi, jet type mixers that require large pumping systems, or agitators that utilize hollow members or spargers positioned to deliver pressurized gas to a mixing zone. Diffused gas delivery systems that do not require gas compression equipment typically comprise self-inducing systems such as venturi systems, vortex systems, and rotor/stator pitched blade turbine reactors.

In traditional systems, the delivery of gas to the desired liquid depth requires the use of fans, blowers, compressors, venturi or vortex systems to entrain the gas or compress the gas to a pressure equal to or greater than the static head at the desired liquid depth. Some traditional systems deliver compressed gas to a porous material, such as a fine hole matrix, mesh or membrane, that is permanently mounted near the bottom of a tank to disperse gas. However, these porous materials are easily fouled and can become blocked when placed in dirty liquids, liquids having a high particulate concentration or high soluble mineral concentration. Fouled materials reduce efficiency, increase operational energy cost, and increase bubble size. Porous materials can also stretch over time, thereby increasing hole size and bubble formation diameter, or harden, thereby causing increased pressure. Larger bubbles, caused by larger hole size, increased pressure or fouling, reduce the available gas-liquid surface area, which reduces the overall Standard Aeration Efficiency (SAE). The efficiency of fouled, blocked or stretched materials can drop to only 30% to 40% of their stated SAE in clean water.

To remedy the higher energy costs associated with fine bubble diffusers, additional energy, maintenance and/or replacement equipment is often needed. Periodic cleaning and maintenance often involve expensive and hazardous HCl injections into the diffuser system and/or the emptying of the aeration vessel followed by physical cleaning. Plastic membranes must be periodically changed, which increases labor, materials and processing costs associated with an aeration system shut-down during installation.

Non-mechanical diffused gas-liquid mass transfer systems, especially those using fine bubble diffusers, can deliver standard aeration efficiency (SAE) of 1.6 to 7 kilograms of dissolved oxygen (DO) from air per kilowatt-hour (kg/kWh) in clean water (SAE-ANSI/ASCE Standard 2-91). Their efficiency, even when clean, is frequently reduced by the intensity of the liquid mixing. The efficiency of a non-mechanical diffused gas-liquid mass transfer system in dirty or contaminated liquid can be only 40 to 50% of the clean water efficiency of the system.

Some examples of diffused aeration systems that are not based on fine bubble diffusers include traditional mechanical diffused aeration systems. Traditional diffused aerator systems can include a high speed prop mixer and a regenerative blower, such as the commercially available Aire-$O_2$ Triton®, large liquid mixers systems using a gas compressor, such as the draft tube aeration system commercially available from Philadelphia Mixers Corp., and jet aeration systems using a gas/liquid mixing jet, a liquid pump and a gas compression device, such as the system commercially available from US Filter Corporation.

Other traditional mechanical diffused aeration systems do not use a compressor, however, these systems require a vortex or a venturi system to create gas pockets at some depth below the surface of the liquid. Examples of these traditional mechanical diffused aeration systems include: U.S. Pat. No. 6,273,402 for a Submersible In-Situ Oxygenator, U.S. Pat. No. 6,145,815 for a System for Enhanced Gas Dissolution Having a Hood Positioned Over the Impeller with Segregating Rings, U.S. Pat. No. 6,135,430 for Enhanced Gas Dissolution, U.S. Pat. No. 5,916,491 for Gas-Liquid Vortex Mixer and Method, and U.S. Pat. No. 5,925,290 for Gas-Liquid Venturi Mixer, each of which are incorporated by reference herein.

In each of these traditional gas-liquid mixing systems that do not require a compressor, either liquid pumps or mixers are required to create high liquid velocities within the system. In order to introduce gas into the system, a velocity head must be created that is greater than the static head at the desired liquid depth at which the gas is introduced to the liquid. To overcome this static head, traditional systems require a liquid moving device, such as an axial or radial liquid pump or mixer, to accelerate a volume of liquid at a high velocity within a tank or holding area.

Conventional mechanical diffused air systems typically have an SAE of from 0.4 to 1.6 kg/kWh. Typically, low speed surface aerators give the highest SAE for mechanical aeration systems. These systems typically state an SAE of from 1.9 to 2.5 kg/kWh. However, surface aerators achieve low gas utilization and require large volumes of gas to be mixed with liquid, causing a high rate of off-gassing, which strips volatile organics from the liquid into the gas.

The present invention has been developed in view of the foregoing and to remedy other deficiencies of related devices.

SUMMARY OF THE INVENTION

The present invention provides an apparatus for mixing gas and liquid. The apparatus can comprise a draft tube having a gas conduit, a liquid inlet and a gas-liquid outlet, an impeller rotatably mounted within the draft tube. The gas can be entrained into the liquid by rotation of an impeller having relatively high angular velocity, which generates relatively low axial velocity of the liquid and relatively low angular velocity of the liquid. Floats may support the impeller and the impeller may have means for maximizing aeration of the liquid.

An aspect of the present invention provides an apparatus for mixing gas and liquid comprising at least one impeller structured and arranged for submersion in the liquid, wherein the at least one impeller is rotatable at relatively high angular velocity and includes means for generating relatively low axial velocity of the liquid.

Another aspect of the present invention provides an apparatus for mixing liquid comprising an impeller driven by a drive axle assembly suitable for use in the transportation industry.

Another aspect of the present invention provides an apparatus for mixing gas and liquid comprising an impeller and a draft tube around the impeller. The draft tube comprises an upper portion, a lower portion and a center portion with a larger diameter than the diameter of the upper portion and lower portion and a collector structured and arranged inside the center portion of the draft tube to collect undissolved gas.

These and other aspect will become more apparent from the following description.

DETAILED DESCRIPTION

Figure 1:
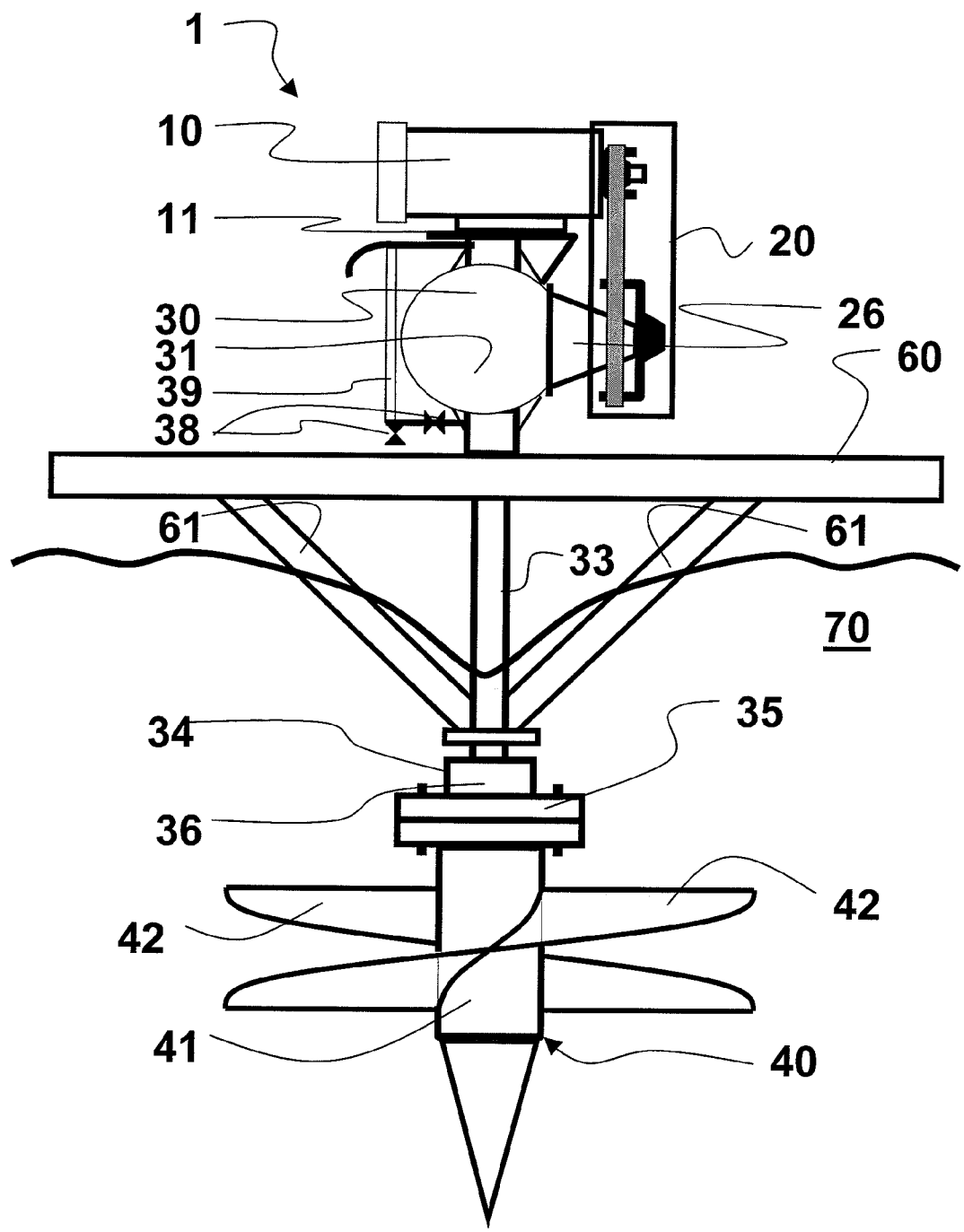
FIG. 1 illustrates a drive and impeller submerged in a liquid wherein the drive and impeller are supported from a horizontal support member and gussets according to one embodiment of the present invention.

The present invention relates to an apparatus for mixing gas and liquid by accelerating a body of liquid utilizing a low pitch impeller having a relatively high angular velocity which generates relatively low axial velocity of the liquid and relatively low angular velocity of the liquid, introducing gas to the body of liquid, and shearing the gas into fine bubbles by rotating the impeller.

As used herein, the term "angular velocity of the impeller" means the speed at which the impeller is rotated, which can be described in terms of rpm of the impeller or the tip speed at the outer diameter of the impeller. Tip speed can be defined as the rpm multiplied by the circumference of the rotating impeller at the blade tip(s). The term "axial velocity of the liquid" means fluid velocity that is substantially parallel to the axis of rotation of the impeller. The term "angular velocity of the liquid" means rate of angular displacement of a fluid that follows a substantially circular path around the axis of rotation of an impeller in a plane normal to the axis of rotation of the impeller.

The term "relatively high angular velocity of the impeller" is in comparison to the relatively low axial velocity of the liquid and in comparison to the relatively low angular velocity of the liquid. For example, an impeller having a diameter of 30 inches may have a rotational speed of greater than 100 rpm, typically from about 150 to about 300 rotations per minute (rpm), for example about 200 to about 225 rpm. Tip speed an impeller according to the present invention may about 20 to about 40 feet per second, for example about 25 to about 35 feet per second. The term "relatively low axial velocity of the liquid" means about 2 to about 10 feet per second, for example about 3 to about 5 feet per second. A typical ratio of impeller tip speed to axial velocity of the liquid may be greater than about 3:1, typically about 4:1 to about 7:1 or more, for example, about 5:1 to about 7:1 The term "relatively low angular velocity of the liquid" means the average rpm of the liquid contacting the impeller. The angular velocity of the liquid may range from slightly positive to counter to the rotation of the impeller, for example about −8 feet per second to about 1 foot per second, for example −4 feet per second to −2 feet per second.

As used herein, the term "pitch ratio" means the ratio of the axial distance of the impeller to the diameter of the impeller. As used herein, the pitch of an impeller is the axial distance the impeller moves a column of fluid per 360 degree rotation of the impeller, assuming 100% efficiency. Relative to typical mixing equipment that axially advances a column of liquid a distance greater than 1 to 2 times the diameter of the impeller per 360 degree rotation of an impeller, the impellers of the present invention advance a column of liquid a distance of about 0.25 to less than 1 time the diameter of the impeller per 360 degree rotation of the impeller at 100% efficiency.

According to one embodiment of the present invention shown in FIG. 1 the mixer 1 has an impeller 40 mounted on a drive assembly. The drive assembly 4 may include a motor 10 coupled to a gear box 30 by way of power converter 20. The power converter 20 may be a sheave and belt assembly or alternatively may be a chain and sprocket assembly. The power converter 20 will often include a cover, as illustrated in FIG. 1. A drive shaft (not shown) is housed with a drive shaft cover 26 and provides communication between the gear box 30 and a driven shaft (not shown) contained within shaft housing 33. The driven shaft housing 33 provides a watertight barrier to protect the driven shaft (not shown). The shaft housing 12 connects to impellers 40 by way of an output hub 34, which includes a flange connection 35 and sealed bearing 36. The drive shaft (not shown) is connected with the impeller 40. Gauge 39 may be provided to allow for easy identification of proper lubrication levels. Valves 38 are provided to drain the gauge glass. The mixer 1 is supported by structural steel 60 which may be one or more sections of I-beam or C-channel. Gussets 61 provide lateral support for the shaft housing 33 and impellers 40.

The present invention relies on a low pitch ratio impeller 2 to rotate with a relatively high angular velocity causing a relatively low axial velocity of the liquid. The impeller 40 may include one or more blades 42 disposed about a central shaft 41. The blades 42 may have a pitch ration of less than 1:1, for example, the impeller 40 may have a pitch ration from about 0.05:1 to about 0.8:1. For example, the blades 42 may have a pitch ratio from about 0.2:1 to about 0.4:1. For example, the impeller may have a pitch ratio from about 0.3:1. If multiple blades 42 are used the blades 42 can comprise multiple pitch ratios. In one embodiment of the invention the diameter of the impeller is greater than the axial length of the impeller, and the impeller includes at least one blade extending at least 30 degrees around an axis of rotation of the impeller. For example, the blade extends at least 60 or 90 degrees around the axis of rotation. The blade may extend at least 180 or 360 degrees around the axis on certain embodiments. The relatively high angular velocity of the blades 42 creates both a drag and liquid gas shear due to the differences in speed of the liquid and gas introduced to the liquid.

In one embodiment gas is introduced to an area just above blades 42 by way of gas conduit 50 shown in FIG. 1. Gas conduit 50 is a conduit spanning from a location above the surface of the liquid to a point just above the impellers 40. Impellers 40 are designed to thrust a volume of liquid 70 in a downward direction or axially along the impellers shaft 41. This action creates a low pressure area above the blades 42 which in turn draws gas through gas conduit 50 and into the liquid 70 where it is subsequently sheared and mixed by impeller 40.

Figure 2:
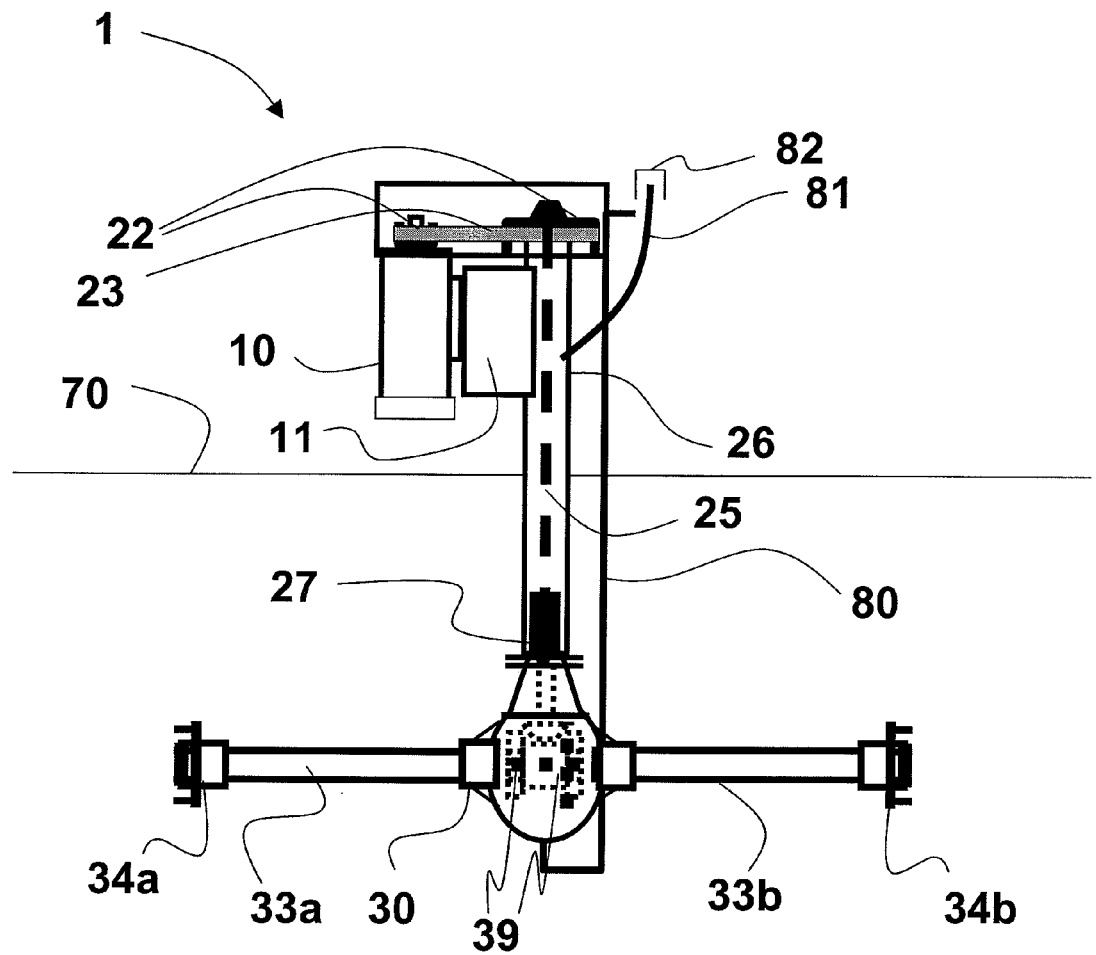
FIG. 2 illustrates a motor with a submerged gear box having two driven shafts on which impellers may be mounted according to one embodiment of the present invention.

Referring now to FIG. 2, another embodiment of a drive assembly of the present invention is shown. Drive motor 6 is positioned in a vertical arrangement with power converter 20 aligned horizontally. Power converter 20 is shown with its cover removed to illustrate the sheave 22 and belt 23 assembly of the power converter 20. Drive shaft housing 26 is aligned vertically and is connected at a submerged end to the gear box 30. Drive shaft 25 is shown by the dashed line in FIG. 2. Drive shaft 25 connects to pinion gear of the gear box 30 by way of a coupling 27 which may be a universal joint, rigid coupling or flexible coupling. In this embodiment gear box 30 comprises a drive axle assembly that is commercially available in the transportation industry for transferring torque from the transmission to the drive wheels of a vehicle such as an automobile or truck. Driven shaft housings 33*a*, 33*b* extend horizontally from the gear box 30 each terminating with an output drive hub 34*a*, 34*b*. As described above structural steel is used to support the unit. In embodiments of the present invention in which the gear box 30 is submerged a lubrication drain tube 80 is provided at the bottom of the gear box 30. The lubrication drain tube 80 extends to a point above the water surface. This allows a vacuum to be connected to the lubrication drain tube 80 to empty lubrication from the unit. New lubrication may be added to the shaft housing 33 through lubrication inlet 81 which is fitted with a cap 82. Impeller 40 (not shown in this figure) are fastened to the output drive hubs 34*a*, 34*b*. This arrangement allows liquid to be pumped horizontally. Although not shown in FIG. 2 structural steel 60 and gussets 61 may be used to support the mixer shown 1 shown in FIG. 2.

Figure 3:
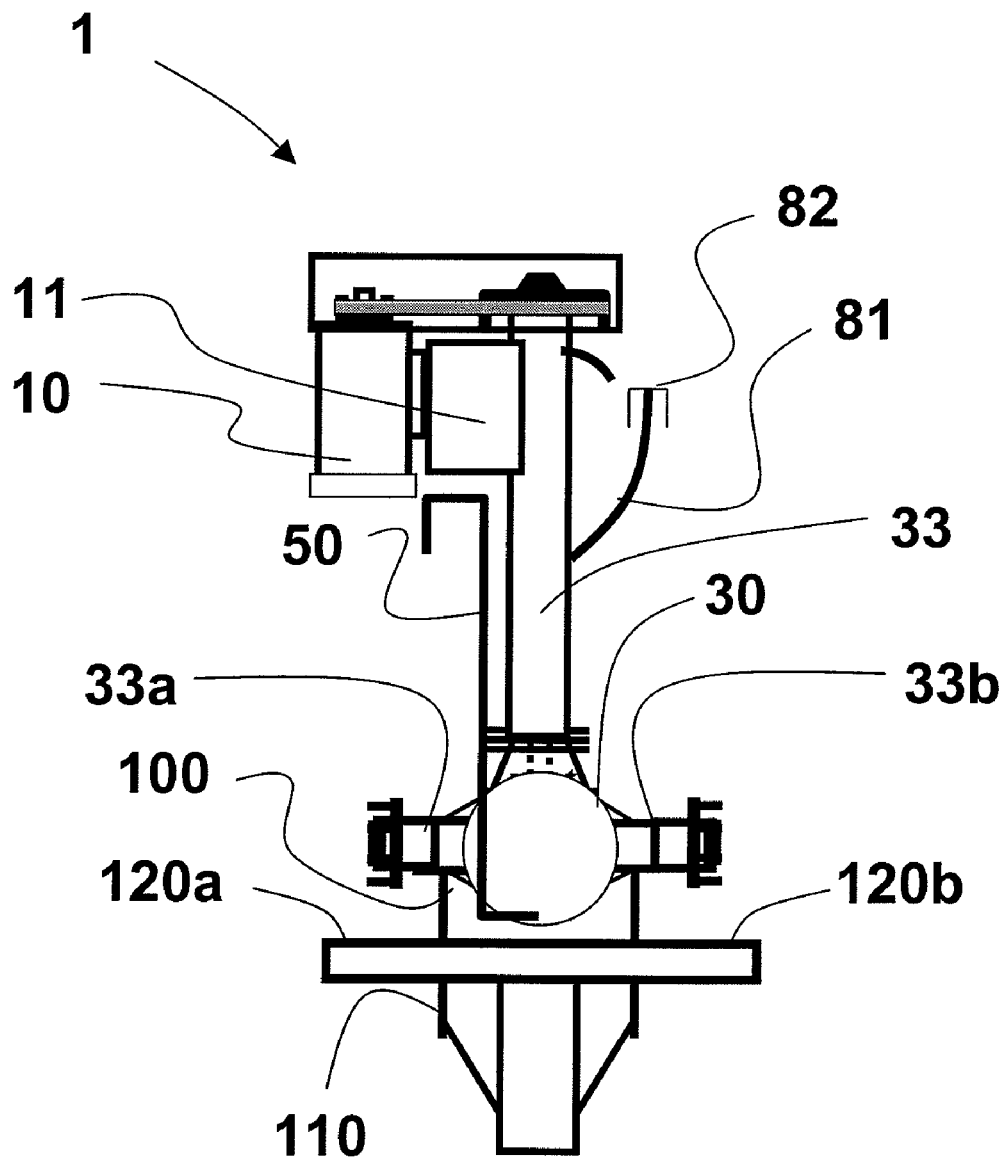
FIG. 3 illustrates a motor having two driven shafts supported from below used for driving horizontal shafts.

Referring now to FIG. 3, in one embodiment of the present invention the mixer 1 is supported by bracket 100 affixed atop support 110. The support 110 and bracket 100 are designed to withstand the torque that the horizontal drive shafts apply to the gear housing as well as the horizontal load applied in an opposite direction as the fluid movement and the vertical load of the weight of the mixer 1. The support 110 can be attached to a float, a wall, or a stand supported from either a wall or a floor of the aeration base in a mixing tank. Also of note in FIG. 3, the driven shaft housings 33*a*, 33*b* and the output drive hubs 34*a*, 34*b* are located relatively close to gear box 30 so that extensions 120*a*, 120*b* of the drive support bracket 100 are below the output drive hubs 34*a*, 34*b*. These extensions aid in an operators ability to install and remove driven shafts or impellers 40 from the drive hubs 34*a*, 34*b* by allowing an end of the impeller 2 to be shimmed on the extension 30 before being removed from or fastened to the drive hub 18.

Although not shown in FIGS. 2 and 3, one or more gas conduits 50 may be included in each mixer 1. The gas conduits 50 may be integral to the shaft housings or may be a separate duct as shown in FIG. 1.

It should be noted that in FIGS. 1-3 the motor 10 is designed to be supported independent from drive shaft 25 by mounting the bracket 11 to the shaft housing 25, the gearbox 30 or a structural member 60. This mounting relieves unnecessary pressure on the drive shaft bearing (not shown) closest to the motor. Accordingly, premature bearing failure and potential damage to the drive shaft 25 is less likely. This reduces the cost and downtime associated with replacing bearings and or shafts.

Figure 4:
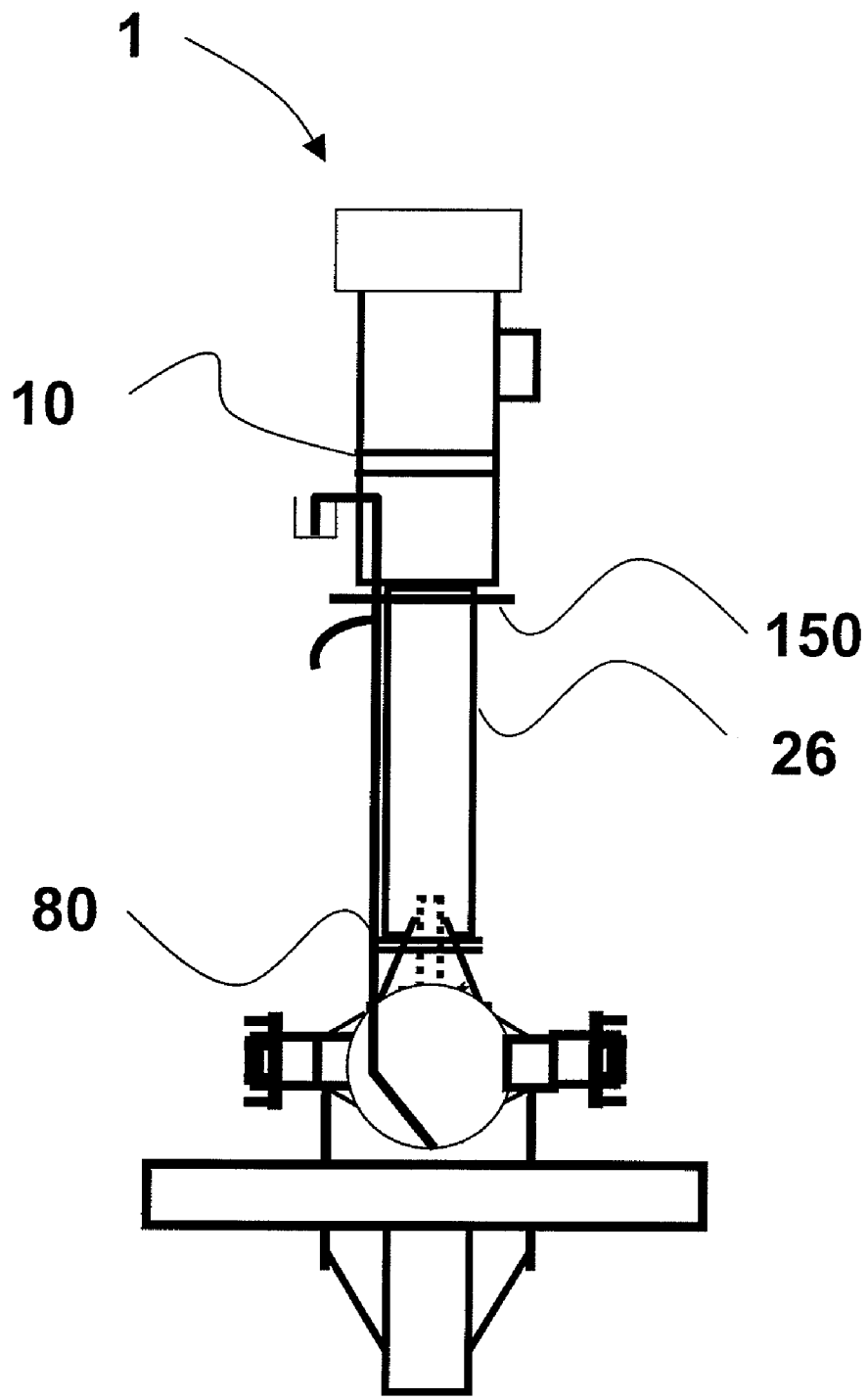
FIG. 4 illustrates a motor directly coupled to a gear box having two driven shafts supported from below according to one embodiment of the present invention.

As can be seen in FIG. 4, an electric motor 6 may be in direct communication with the drive shaft and connected to the shaft housing 26 through flange coupling 150. In this embodiment a power converter 20 is not required and power to the gear box 30 is provided directly from the drive motor 10 through the drive shaft to the gearbox 30.

Figure 5:
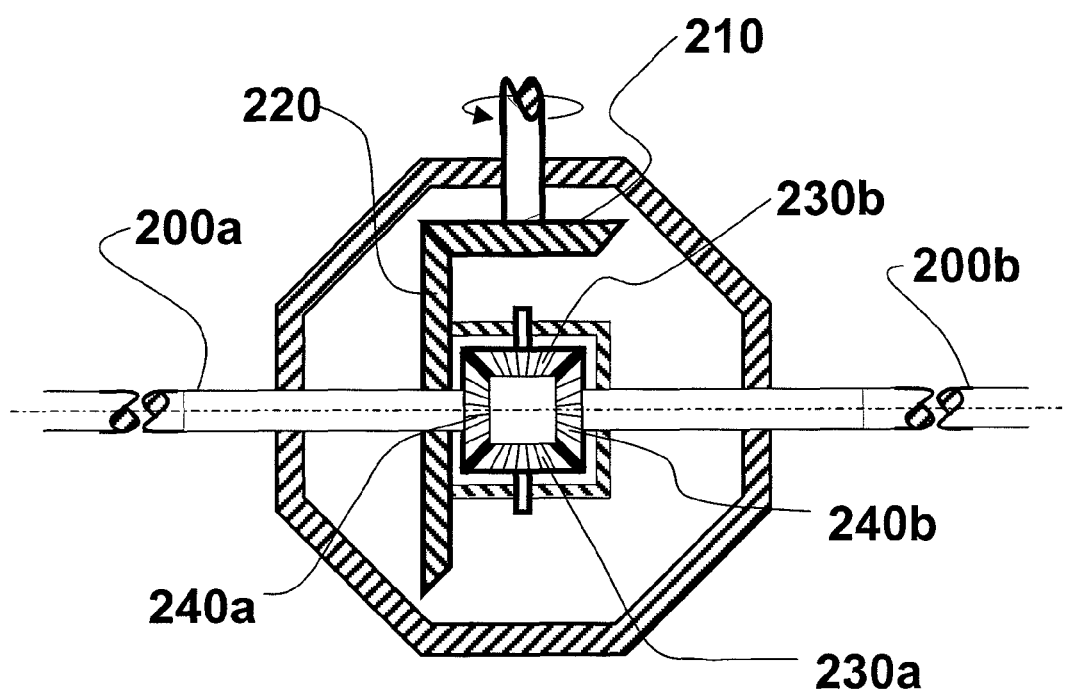
FIG. 5 illustrates a cross section showing the internal gear mechanisms of a drive axle assembly used in the transportation industry according to one embodiment of the present invention.

FIG. 5 illustrates the inner assembly of a common drive axle assembly used in the transportation industry. Drive shaft 25 may be connected to the pinion gear 210 by way of coupling 27 or may be directly connected to the pinion gear 210. Pinion gear 210 is intermeshed with ring gear 220 which provides rotation of driven shafts 200*a* and 200*b*. Driven axles 200*a*, 200*b* are interrelated by side gears 240*a*, 240*b* which intermesh with spider gears 230*a*, 230*b*. While side gears and spider gears are shown in FIG. 5 these gears are often locked/pinned on place or removed so a solid driven shaft may be used. This type of gearbox is desirable for this particular application because it provides a right angle drive that is plentiful in supply and also cost efficient as compared to other industrial drives. Additional benefits of using a drive axle assembly may include: a gearbox/axle housing capable of being used as a structural member, robust ring and pinion gearing having ratios of from 3:1 to 7:1 allowing the proper output rpm for typical electric drive motors, gearing with an independent bearings from that of the output drive hub, a drive axle connected to the gear reducer through a splined connection, an integral axle extension rotating within a stationary housing, very effective oil sealing between the rotating drive hub and the bearing spindles, robust bearings located in the drive hub to minimize any overhung loading on the gearbox, a pre-manufactured concentric hub/wheel assembly, and industrial wheels that upon which impeller blades can be affixed to.

Figure 6:
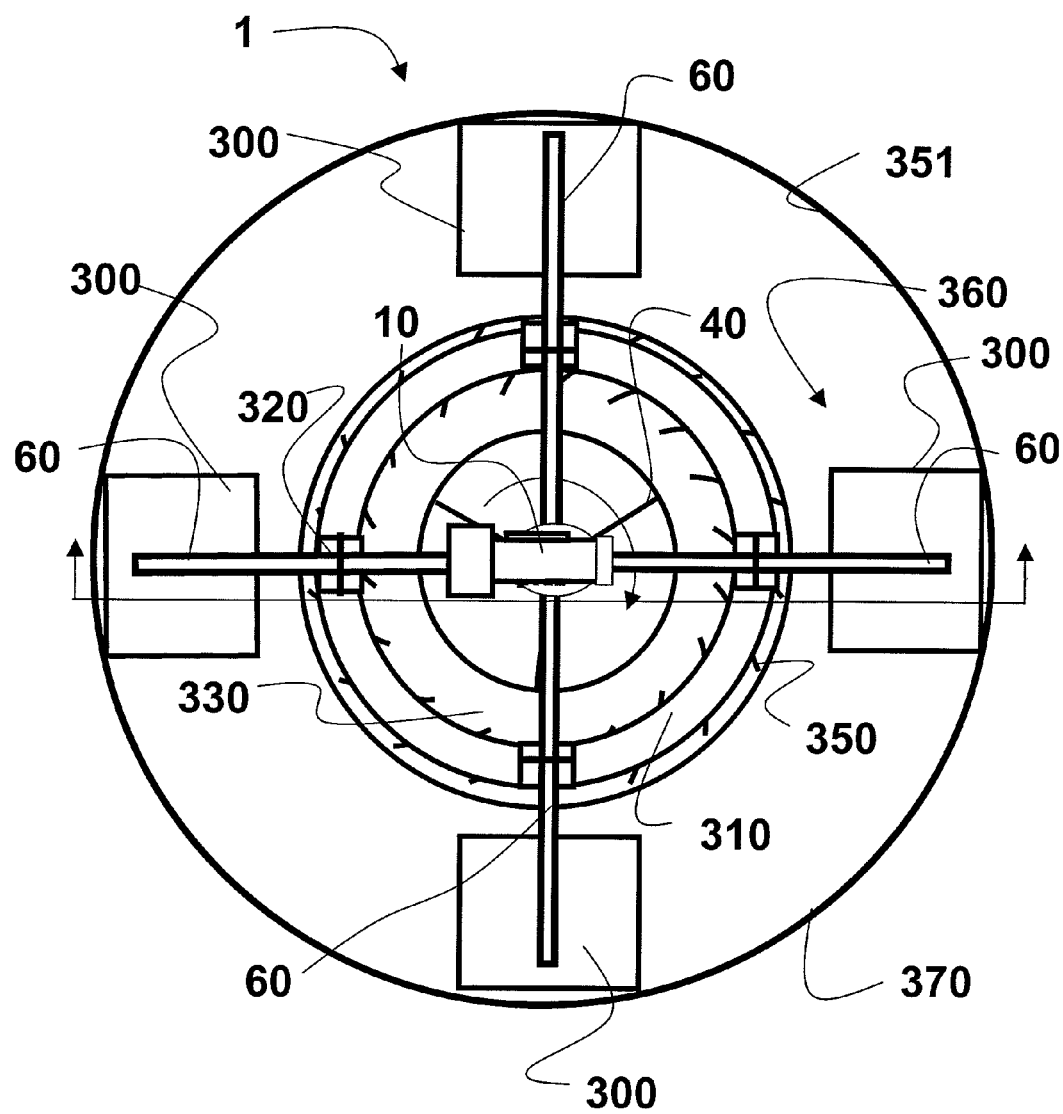
FIG. 6 is a plan view of an impeller and drive supported from floats in the liquid having a draft tube and membrane connected between the floats and draft tube according to one embodiment of the present invention.

Referring now to FIG. 6, a float system 30 is shown. Structural steel members 60 which rest upon floats 32 support the mixer 1. Impellers 40 are connected and driven by the drive assembly 4. Impellers 40 are further located inside a submerged draft tube 36. In this embodiment the draft tube 36 has a bell mouth top 38. Structural steel members 20 also support the draft tube 36 by way of connections 40.

Figure 7:
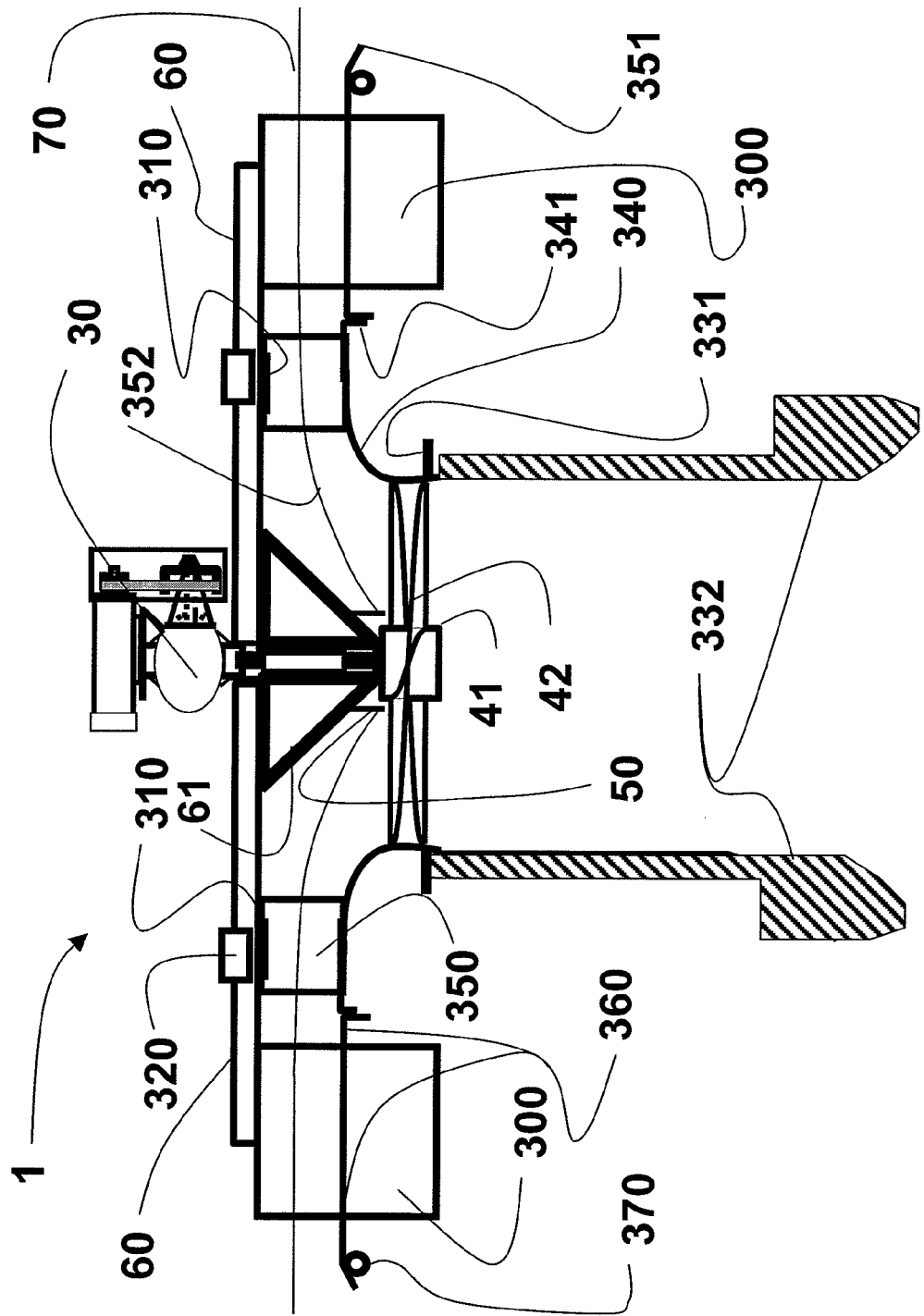
FIG. 7 is an elevational cross sectional view illustrating the mixer shown in FIG. 6.

Referring now to FIGS. 6 and 7, a mixer 1 is shown with a centrally located motor 10 mounted on structural steel members 60. Floats 300 support the structural steel members 60. Also supported by structural steel members 60 is a support ring 310 attached by way of clamps 320. Suspended from clamps 320 are inlet vanes 350 connected to a draft tube 330. The portion of the draft tube 330 that connects to the inlet vane is a flared top portion referred to as a bell mouth 340. The bell mouth 340 is connected to the remaining cylindrical portion of the draft tube by way of draft tube flange 331. A bottom portion of the draft tube 330 includes a ballast section 332. The ballast section 332 is made from a substance with a specific gravity greater than the activated sludge being aerated. The mass of the ballast section 332 is calculated by estimating the total gas hold up volume in the draft tube and the thrust created by the axial jet of water leaving the draft tube. Proper weighting of the ballast section 332 permits float rocking and instability and is used to establish an optimum depth of the impeller 40 in the liquid. The draft tube extension 332 is under a slight pressure relative to the parts outside of it. The draft tube extension 332 can be of fiber-reinforced plastic, a plastic membrane or a tightly woven polypropylene cloth supported on its exterior by a stiff flame. The draft tube extension 332 may also be made of a stiffer material like but not limited to FRP, HDPE and concrete pipe sections as found in sewer and culvert construction. The bell mouth 340 may be made of similar material, however the section of the draft tube adjacent the perimeter of the impeller 40 preferably has an upgraded corrosion and erosion resistant material.

Gusset 61 forms a pyramidal shape hanging from structural steel members 60. Gusset 61 provides additional rigidity to structural steel member 60 and also serve to stabilize driven shaft cover 33. Affixed to a membrane flange 341 of the bell mouth 340 is a membrane 360 which extends radially to an outer area 351. Membrane 350 may be made from high-density polyethylene HDPE flexible membrane as found in landfill construction. The membrane 360 is supported and held taunt at its perimeter by stiff member 370. Membrane 370 can be held by a pocket welded into the perimeter of 370, by sandwiching the membrane 360 perimeter between two outer rings, by bolting the membrane 360 to stiff member 370 or by banding the perimeter of membrane 360 to the stiff member 370. The membrane 360 may be bolted to membrane flange 341 at its inner edge.

In the embodiment shown in FIGS. 6 and 7, a thin membrane of corrosion resistant material displaced around and attached to the pyramidal shaped gussets 61 forms the gas conduit 50. The bottom of gas conduit 50 is circular and ends at a close proximity, for example, 5-25 mm above the leading edges of blades 42 of impeller 40. The diameter of gas conduit 50 is 1.1-1.5 times the diameter of impeller hub 41. The gas conduit 50 communicates the air that is drawn into, across or through the impeller 40 and should be noted that the draw of the impeller 40 creates a lower water level 352 than the remaining water level 351 in the rest of the tank. This exposes the top of gas conduit 50 so that no air pressure is required to transport fresh air to the impeller 40.

The design shown if FIGS. 6 and 7 is used to minimize the re-entrainment of low oxygen concentration gas and maximize the incorporation of lower dissolved oxygen concentration water than the relatively high dissolved oxygen water found adjacent to the inlet vane perimeter that has no separation. Membrane 360 prevents spent air bubbles from being entrained with the pumped liquid. In this design the bubbles escape from the pumped liquid as it travels across the zone above membrane 360 and through inlet vanes 350. In this manner dilution of fresh air containing 23% by weight oxygen through gas conduit 50 by the nitrogen enriched spent gas contained in bubbles that have traveled through the liquid.

Figure 8:
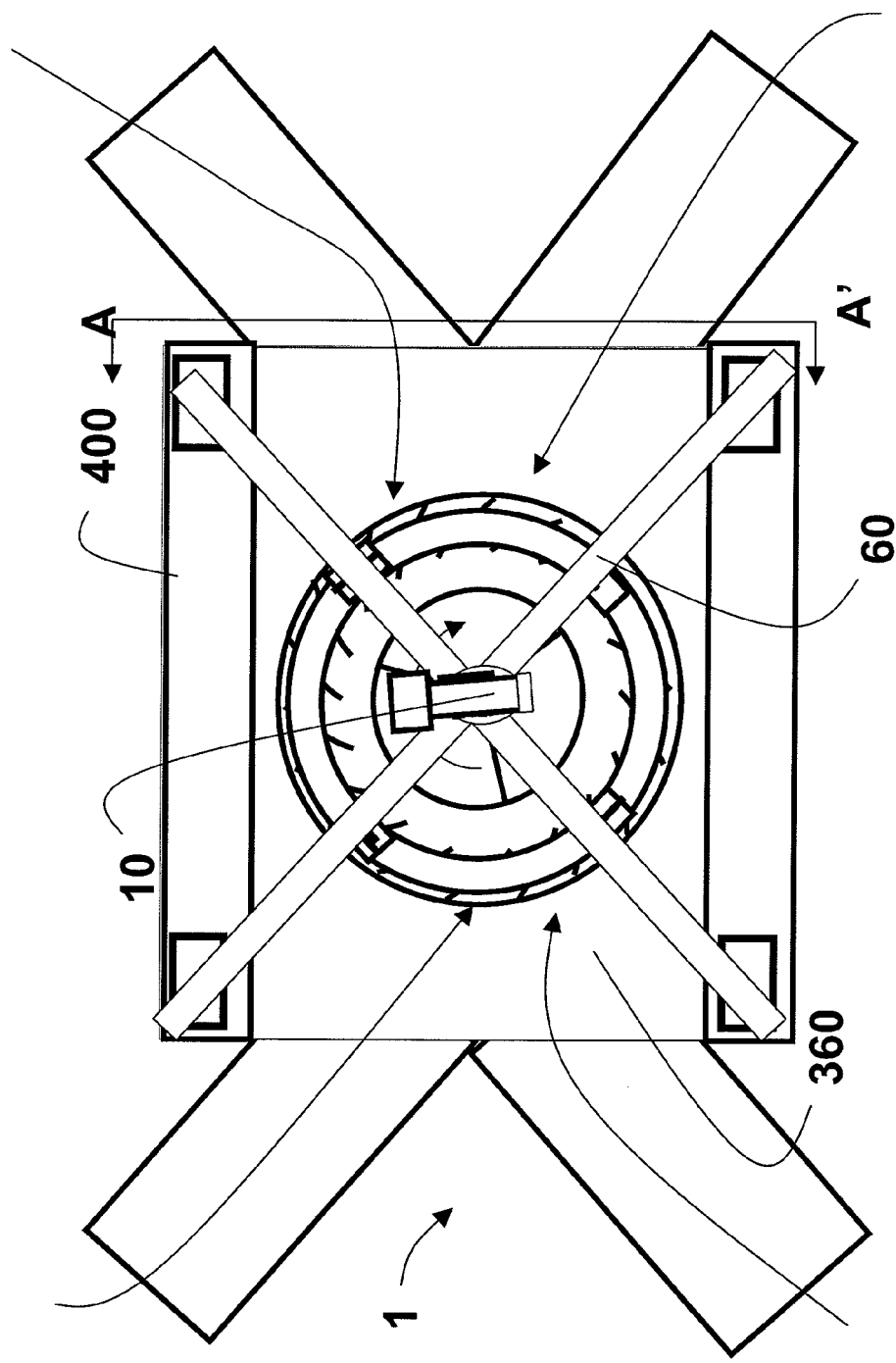
FIG. 8 illustrates an impeller drive and draft tube supported by pontoons and includes launderers for delivering fluid to the mixer.
Figure 9:
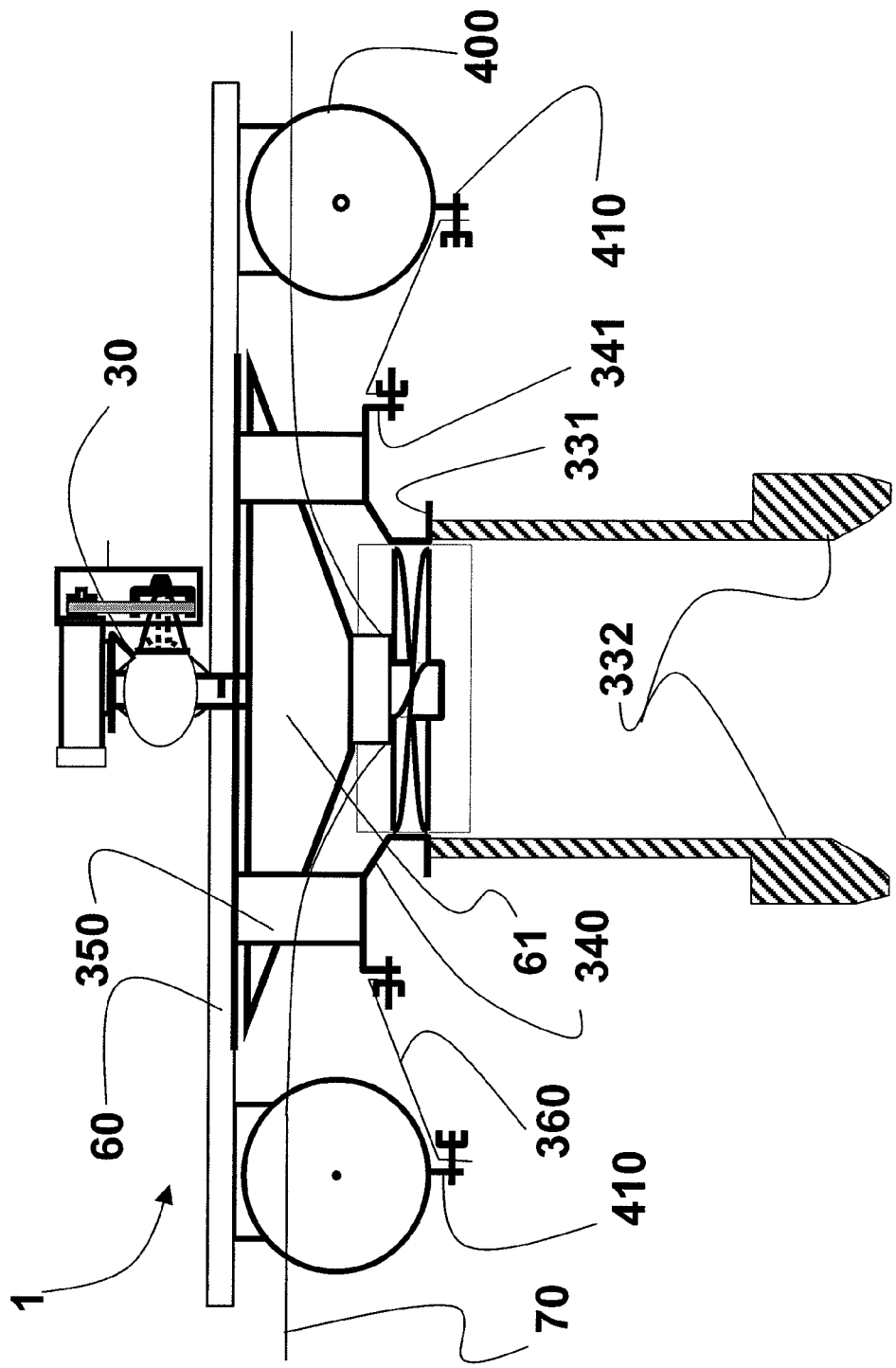
FIG. 9 illustrates a cross sectional elevation view of the mixer of FIG. 8 along line A-A' according to one embodiment of the present invention.

In another embodiment of the present invention shown in FIGS. 8 and 9, pontoons 400 capable of supporting the applied loads support structural steel members 60. The pontoons 400 are to be filled with closed cell marine polyurethane or polystyrene and completely sealed. Double walled corrugated HDPE drainpipe may be utilized provided that either internal or external longitudinal rigidity is built into the pontoon and they are sealed at both ends. In this embodiment, membrane 360 is held taunt between keel flanges 410 and membrane flange 341. In this configuration liquid is ducted above the membrane 360 and between pontoons 400. As shown by the arrows in FIG. 8.

Figure 10:
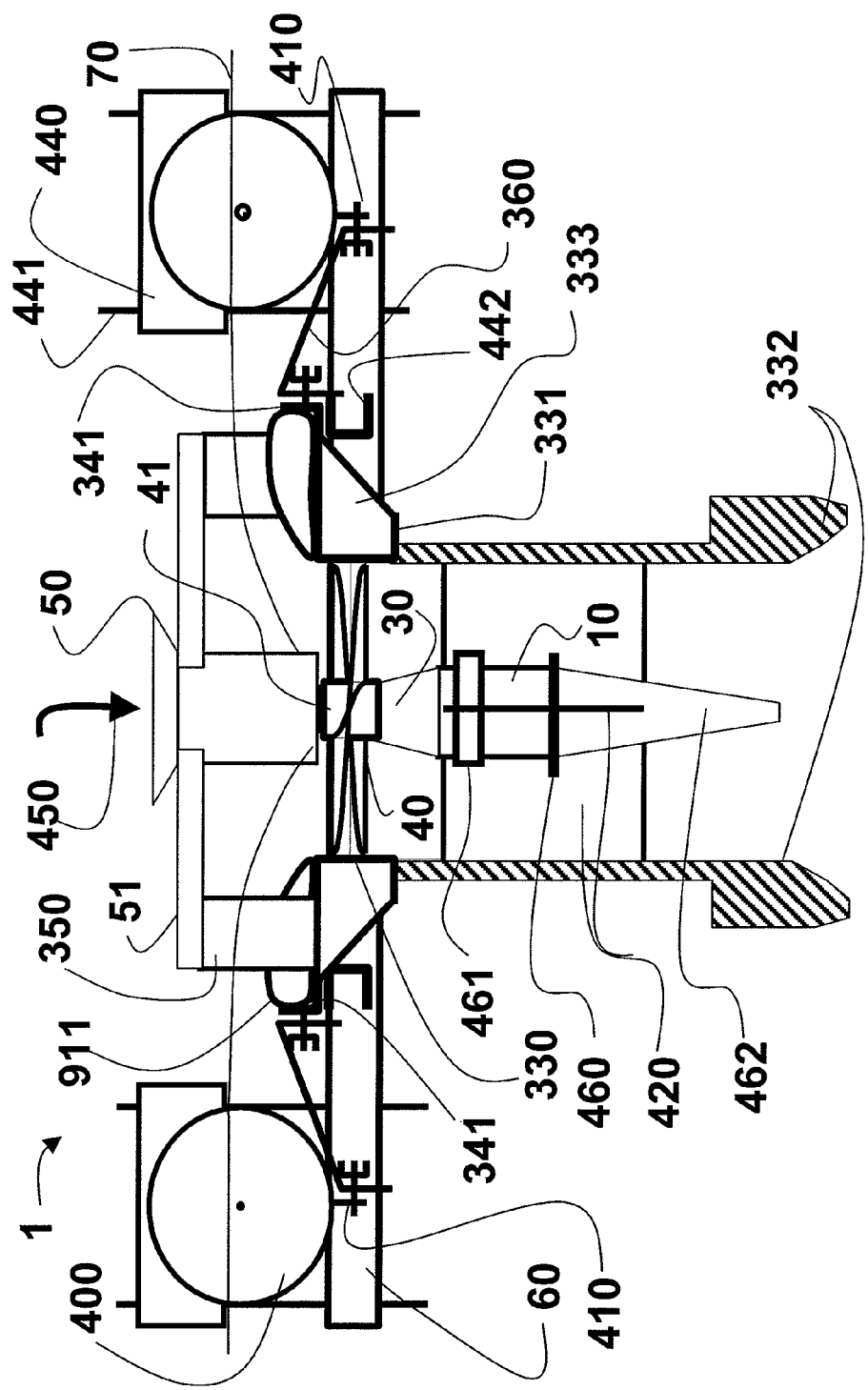
FIG. 10 illustrates a cross sectional elevational view of a mixer supported by pontoons where the drive is submerged in the liquid according to one embodiment of the present invention.

Another embodiment of the present invention utilizing pontoons 400 to support a mixer 1 is shown in FIG. 10. In this embodiment a submersible motor 10 in gear box 30 is used to drive the impeller 40. Supporting the motor 10, gear box 30 and impeller 40 are a motor mounting plate 460 and ring 461 which are attached outlet straightening vanes 420. The outlet straightening vanes 420 are fastened to draft tube extensions 332. The impeller blades 42 are fastened, welded, bolted or wrapped onto the impeller hub 41 so that the center of mass of the impeller 40 is co-planar with the output bearings or between the top bearing and the lower bearing of the driven shaft. The impeller hub 41 has a closed airtight top. The level of the top seal of the driven shaft can be designed to be above the water level when it is in operation. The closed impeller hub 41 traps gas in the area of the top seal of the driven shaft. This minimizes the effect of water born contaminates destroying the integrity of the top seal of the driven shaft. Planetary gear reducers are ideal for this service. The configuration of the drive in this embodiment lowers the center of gravity of the mixer and eliminates the risk of fouled motor windings and gear box lubricants. Should the activated sludge or aerobic sludge.

The outlet straightening vanes 420 are supported from the walls of the draft tube extension 332. The conical transition 462 below the submersible motor 10 gives rigidity to the outlet straightening vanes 420, motor mount and smoothes the flow of gas liquids passing over it.

Structural steel members 60 are connected at one end to the draft tube 330 by way of a supporting flange 442. Structural steel members 60 are oriented below pontoons 400 and connected to the pontoons 400 by way threaded rods 441 connected to saddles 440 atop the pontoons 400.

Unlike the bell mouth 340 arrangement of other draft tubes 330, FIG. 10 illustrates a draft tube 330 with a flat top. Flow smoothing shapes 430 are installed on top of the draft tube 330 and between inlet vanes 350 to transition the flow of liquid from horizontal into a cyclonic flow down a vertical path. These shapes can be molded or formed from any substance that has a smooth surface who's corrosion resistant and can be affixed to the draft tube 330. To support the flat top of the draft tube in this embodiment draft tube gussets 333 are placed between the horizontal and vertical portions of the draft tube. As in earlier embodiments a membrane 360 is stretched taunt between the keel flanges 410 of the pontoons 400 and a membrane flange 341 around the perimeter of the draft tube 330.

Arms 51 are attached to the top of the inlet vanes 350 and extend horizontally to support the gas conduit 50. This arrangement allows airflow 450 to be delivered to impeller 40. In one embodiment, the gas conduit 50 is mounted to impeller hub 41. In this embodiment the gas conduit 50 is made of a lightweight material which rotates with the impeller 40 and the support arms 51 are not required.

As with earlier embodiments liquid in this embodiment is ducted between the pontoons 400 and through a shallow channel above the membrane 360 and through inlet ducts 350. In this manner spent gas bubbles are able to escape the liquid and are not reintroduced through impeller 40.

Figure 11:
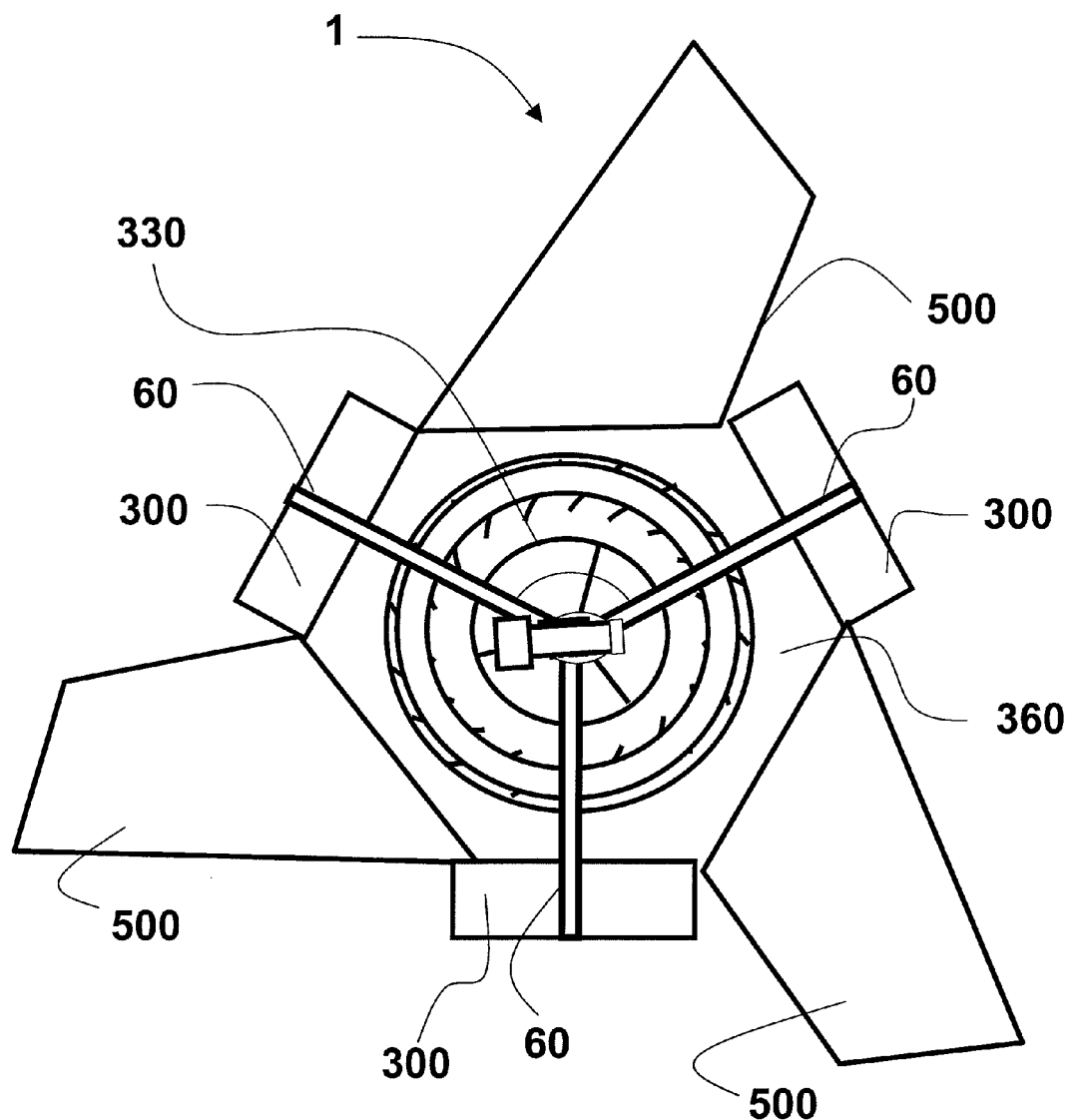
FIG. 11 illustrates a plan view of an impeller drive and draft tube supported by floats where water is delivered to the impeller and draft tube by way of launderers according to one embodiment of the present invention.

Referring now to FIG. 11, an embodiment of the present invention having three floats 300 is shown. The floats support structural members 60 which in turn support the draft tube and impeller assembly. Structural members may be made from any suitable material, for example steel or fiberglass. Launderers 500 may be vertically supported open channels or closed conduits. Launderers serve to draw liquid from what could be bubble free, quiescent, or stagnant. The liquid is drawn through launderers 500 and across the membrane 360 to the draft tube and impeller assembly in the center of the mixer 1.

Figure 12:
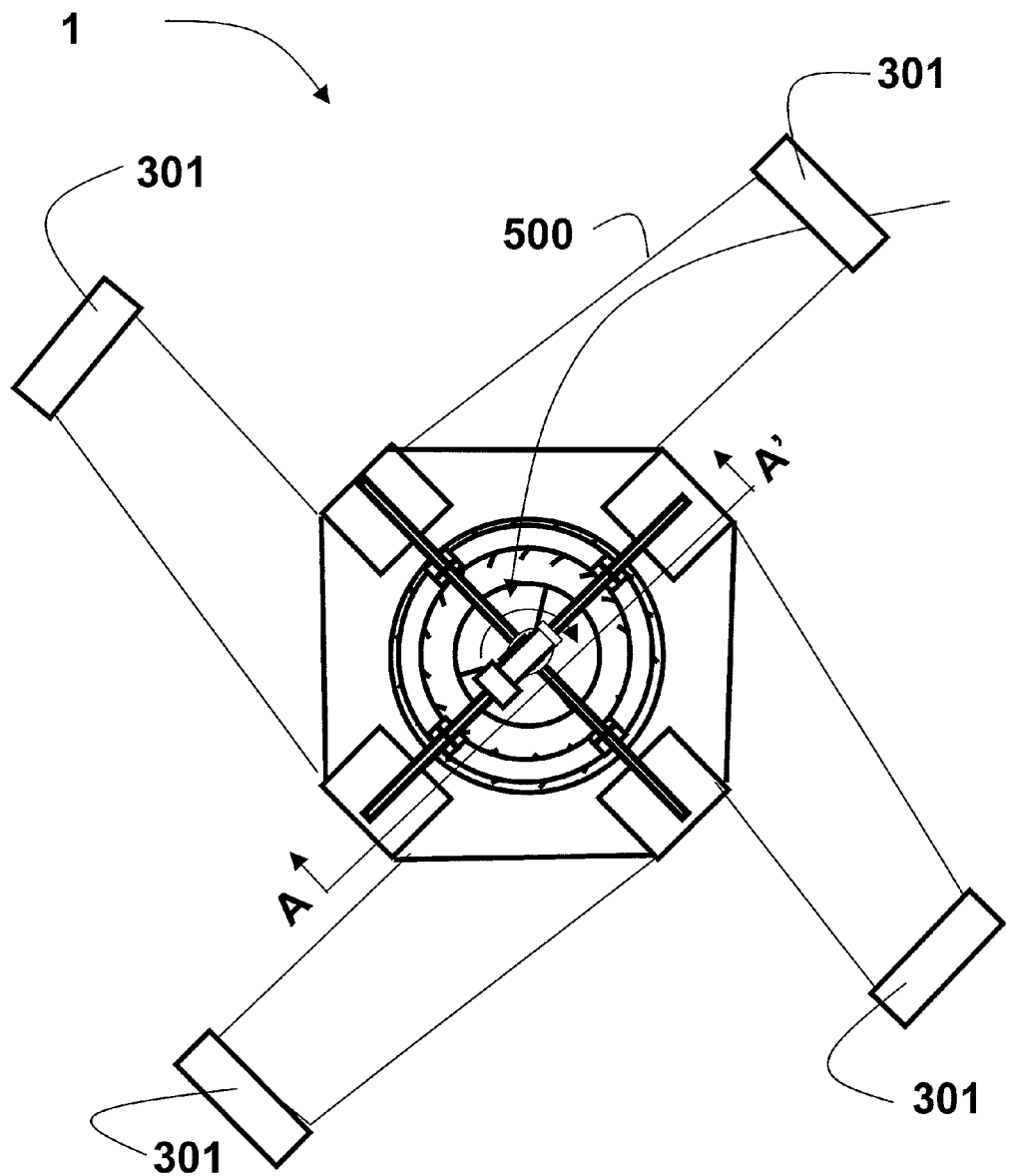
FIG. 12 is a plan view illustrating a float supported mixer having open launderers supported by secondary floats for delivering liquid to the mixer.
Figure 13:
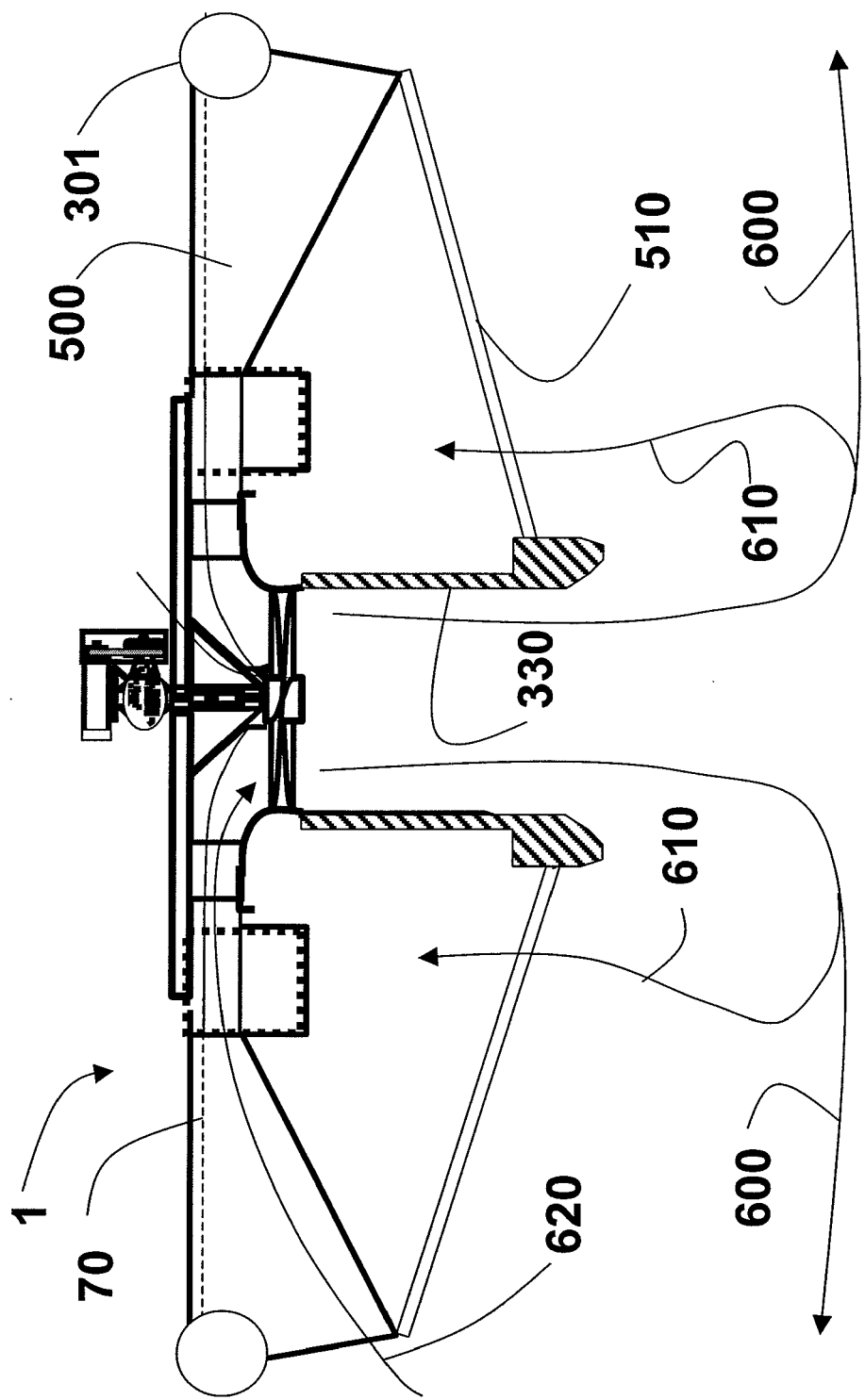
FIG. 13 is a cross sectional elevational view of the mixer shown in FIG. 12 according to one embodiment of the present invention.

Referring now to FIGS. 12 and 13, a mixer is shown supported by a float system as described above. In this embodiment the mixer 1 additionally has 4 launderers 500 supported at a distal portion by secondary floats 301. The inlet opening of each launderer 500 is held below the water 70 by a spar or wire connected to the draft tube 330 at a position below the level of the bottom of the inlet. The inlet opening of the launderer 500 may be either rectangular, square, trapezoidal, oval, round or triangular and is held in that shape by rigid structural members. Flow patterns of the liquid 70 are illustrated in FIG. 13. Inlet flow 620 is drawn from the area outside of secondary float 301. Liquid 70 exiting the impeller has a primary float pattern 600 and as secondary flow 610. The primary flow 600 is designed to sweep the floor of the aeration vessel. As this occurs air bubbles quickly disengage from the primary flow 600 and create secondary flow 610. The launderers serve to minimize the direct pumping of aerated water containing bubbles with low oxygen concentration. As used herein the term filter media refers to media used to filter water or other liquid. As used herein the term fixed film media or bioreactor refers to media used to hold biomass for cleaning water.

Figure 14:
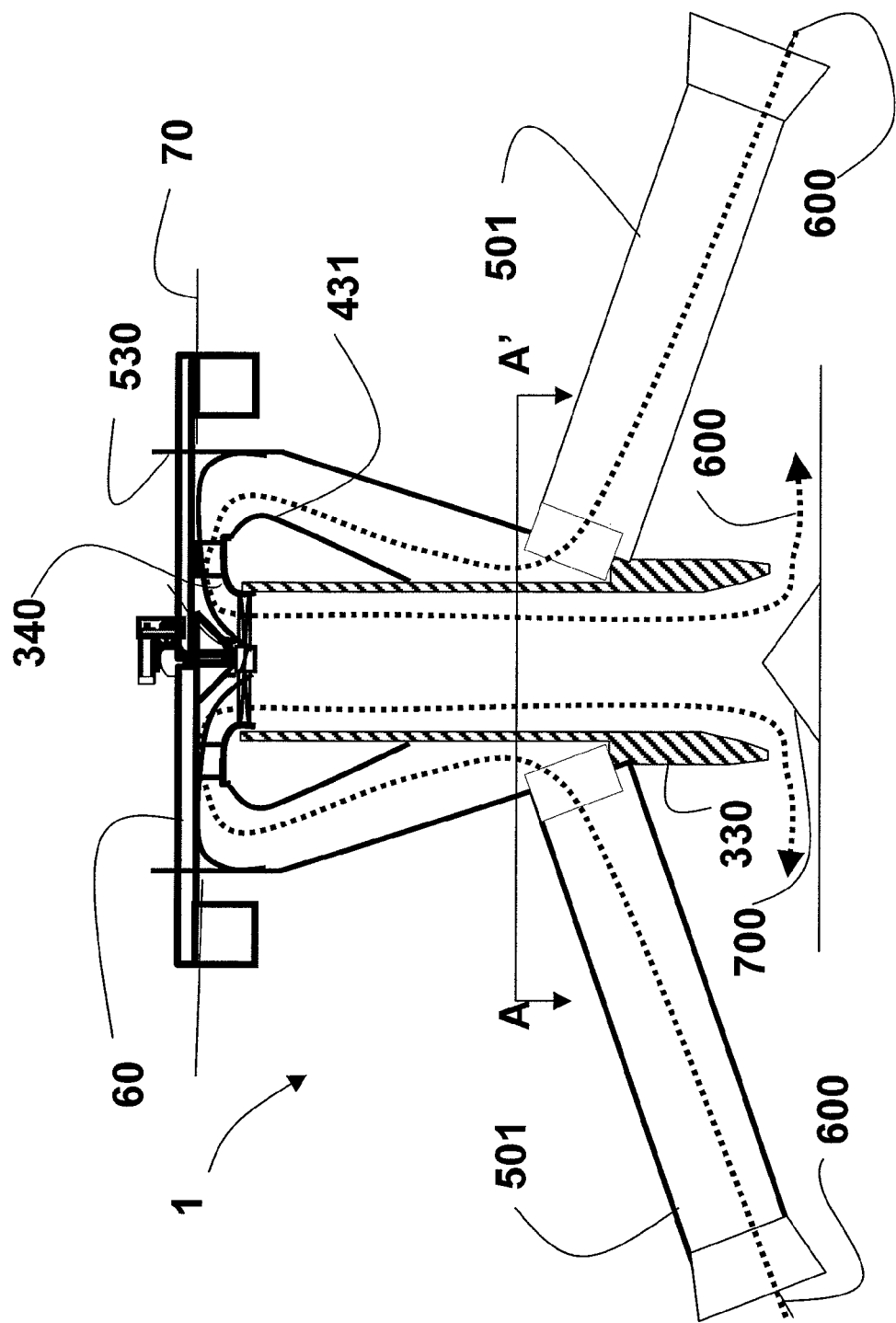
FIG. 14 is a cross sectional elevational view of a drive, impeller and draft tube supported by floats where the launderers are replaced by conduits according to one embodiment of the present invention.
Figure 15:
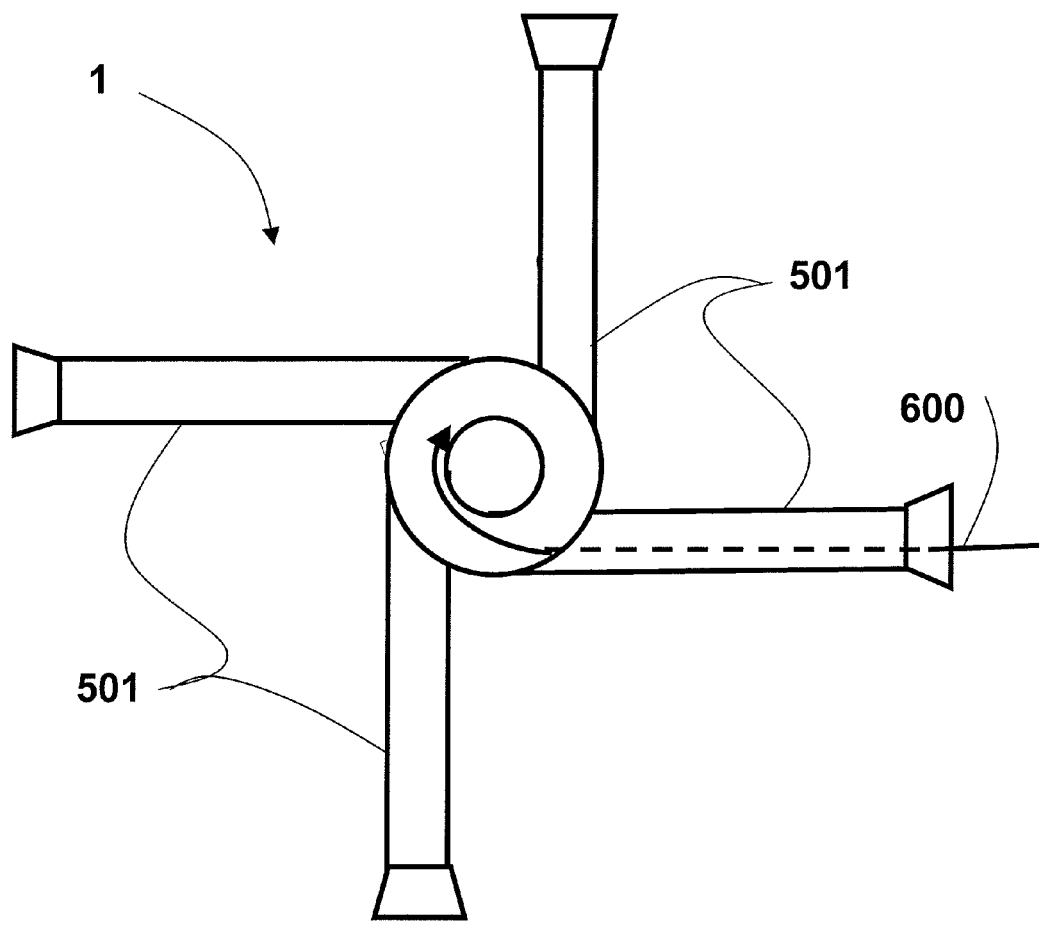
FIG. 15 illustrates an arrangement of the launderers where the launderers are closed conduits and are tangentially aligned with the mixer to pre-rotate the fluid according to one embodiment of the present invention.

Another embodiment of the present invention shown in FIGS. 14 and 15 incorporates a completely submerged inlet ducting system made of closed wall conduits 501 instead of an open launderer 500. The closed wall conduits 501 are supported at their high point by the draft tube 330 and by an enclosure 530 surrounding the draft tube 330. An effective shape for the enclosure 530 is a cylindrical or conical section that is enclosed at its base except for the closed wall conduits 501 entering the enclosure 530. The enclosure 530 is open wall above the surface of water 70. Flow smoothing shapes 431 are affixed to the exterior of the draft tube 330 at a point below the bell mouth 340. The closed wall conduits 501 may be rigidly fixed to the enclosure 530 and held in place by spars and cable. The closed wall conduits 501 may be flexibly fixed and weighted so that the inlet of each rides on the bottom surface of an aeration vessel. It may be desirable to allow the closed wall conduits 501 to flex vertically. This can be accomplished by hinging the closed wall conduits 501 and sealing around the conduits 501 with loose fabric. Primary flows 600 are taken well away from the discharge of the traffic tube 330. A diverter is located below the draft tube to reduce bottom erosion and smooth the turning of the aerated discharge of liquid. FIG. 15 shows a cross-section along line A-A' showing the four closed conduits 501 entering the enclosure 530 at a tangent to start the liquid 70 spinning counter to the rotation of the impeller.

Figure 16:
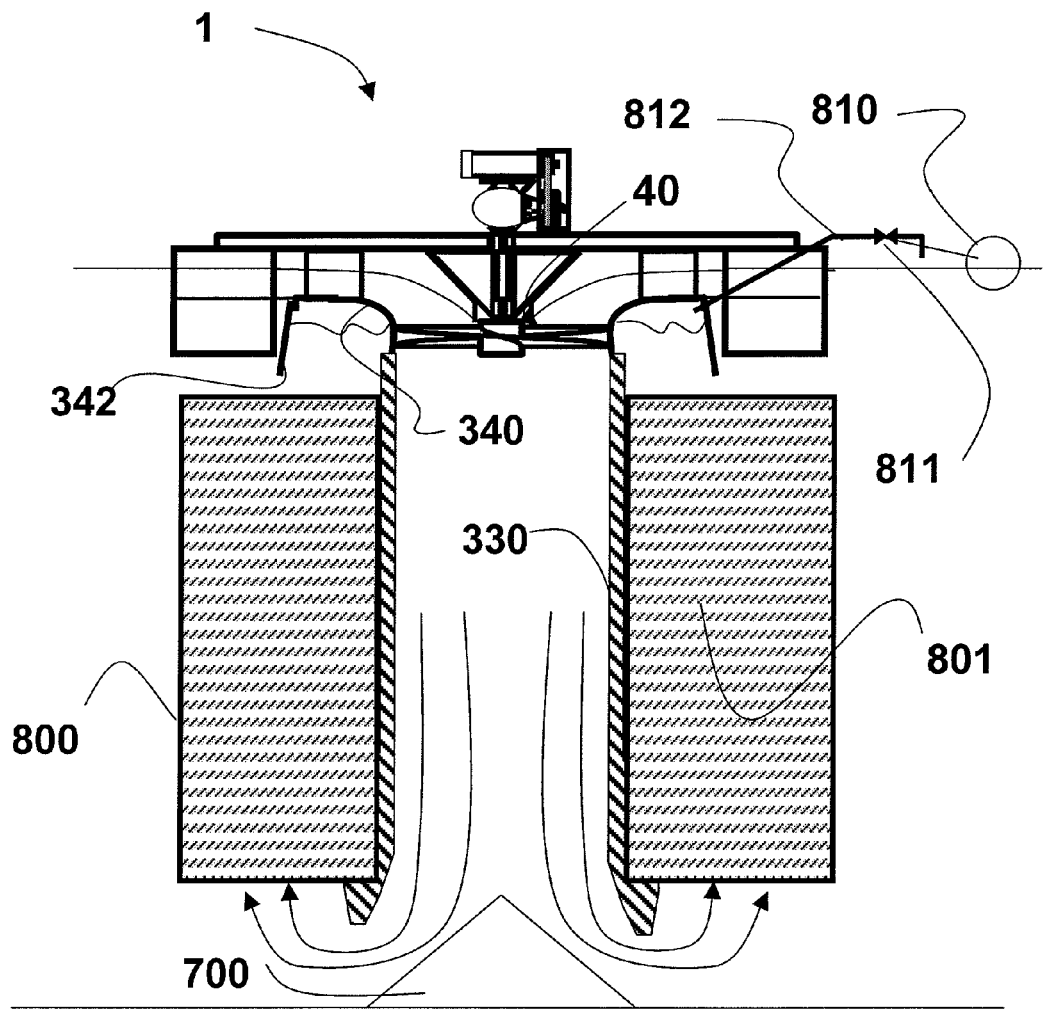
FIG. 16 illustrates a cross sectional elevation view of a drive, impeller and draft tube supported by floats with filter media or biomass support attached to the draft tube and including a level control system for the mixer according to one embodiment of the present invention.

Referring now to FIG. 16, a mixer 1 is shown with a draft tube 330 and float system as described in earlier examples. Attached to the draft tube 330 is a frame 800 for holding a fixed film media 801 which promotes growth of microorganisms useful in wastewater treatment. The frame 800 is made from a structural corrosion resistant tubing and corrosion resistant netting or woven wire, corrugated plastic plates or filter membranes. A diverter 700 is positioned below the draft tube 330 to direct liquid flow outwardly and protect the bottom of the vessel from erosion. The frame 800 and biomass growing thereon add considerable weight to the impeller and draft tube assembly. To counteract this downward force an extension 342 has been added to the membrane flange of the bell mouth 340. The extension 342 traps air under bell mouth 340. This trapped air increases the buoyancy of the mixer 1 when the mixer is used as a fixed film bioreactor. In this embodiment a level control system 810 is provided. The level control system 810 includes a vent pipe in communication with the gas trapped below the bell mouth 340 in a control valve 811 for venting or delivering pressure to the gas below the bell mouth 340. The level control device 810 shown, for example a float ball, closes the control valve 811 as the mixer sinks. This allows gas to be collected in the area below the bell mouth 340 and increases buoyancy of the mixer. Gas is added to chamber from bubbles rising upon exit from the draft tube. If the mixer 1 rises too high above the water level, the level control system 810 will open valve 811 to vent gas from the area below bell mouth 340, decreasing buoyancy of the mixer 1. In this manner impeller 40 is maintained at the most efficient level below the surface of liquid 70. One advantage of using the high volume gas and liquid flow of the impeller 40 in draft tube 330 of the present invention in combination with the frame 800 and fixed film bioreactor is that the system provides high flow oxygen and nutrients to microbes attached to the fixed film bioreactor 801. An advantage when using the fixed film media 801 is that the high volume gas and liquid flow through the fixed filter media 801 causing scouring of and preventing fouling of the filter surface. Regardless of the media 801 used this embodiment of the present invention provides low energy cost turbulence while the same energy is effectively providing dissolved oxygen to the activated sludge often present in liquid 70. Frame 800 may be wrapped with a membrane to direct flow in a vertical direction and prevent radial flow through the fixed film media 801 mounted on the frame 800. Although not shown in FIG. 16, launderers 500 similar to those shown in FIG. 12 are applicable to this embodiment.

Figure 17:
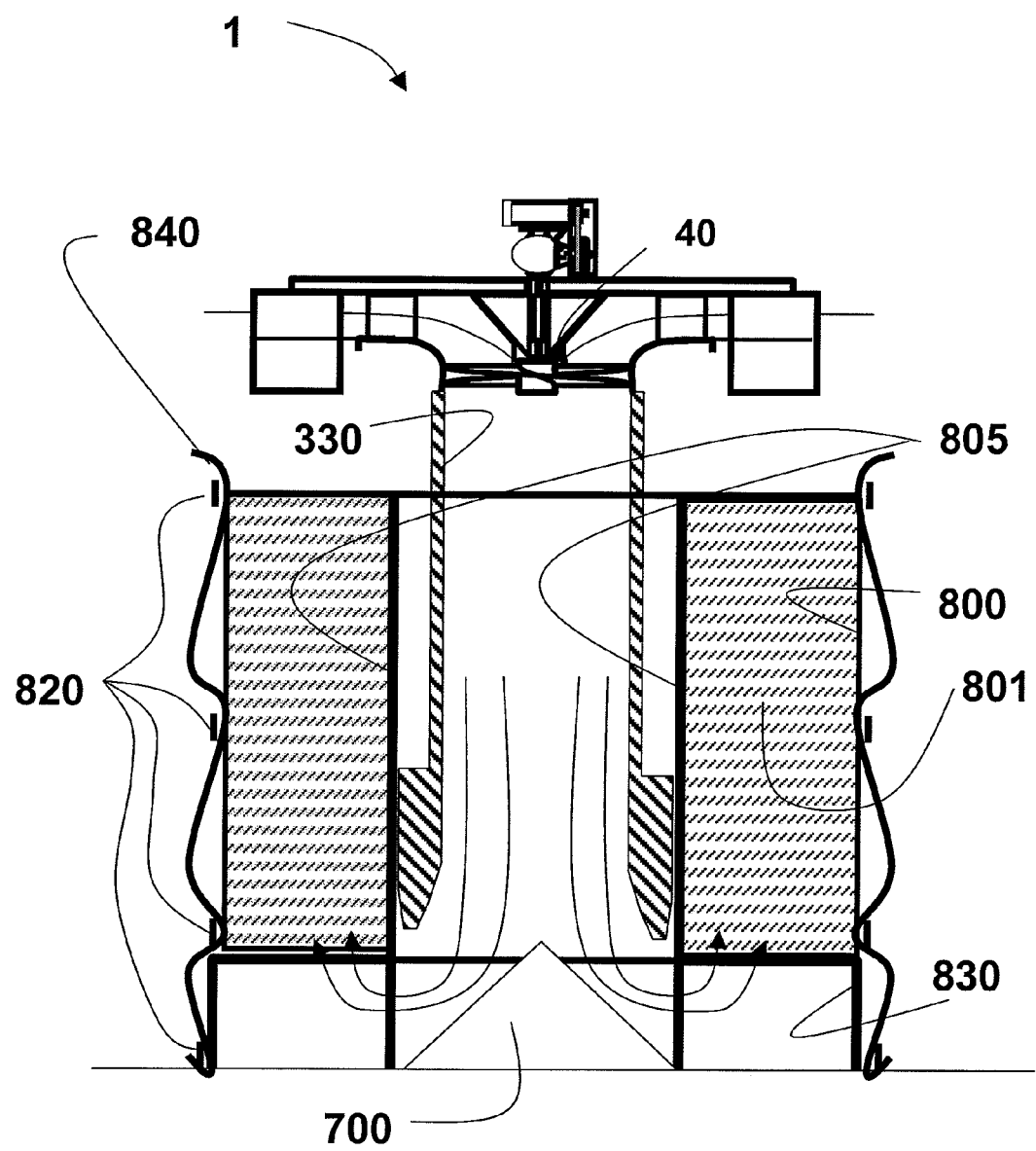
FIG. 17 illustrates a drive, impeller and draft tube supported by floats with independently supported filter media or biomass support according to one embodiment of the present invention.

Referring now to FIG. 17, the rack 800 for supporting the fixed film media 801 is supported by a stand 830 either resting on the floor of an aeration vessel or supported from supports mounted to the vessel. Guide rails 805 are vertically positioned on the interior of frame 800. This configuration allows the draft tube 830 and float system to rise and fall with the level of the liquid 70. A diverter 700 is again positioned below the draft tube to promote a maximum flow of aerated liquid past the filter media 801 a cover 840 may be displaced around the frame 800. The cover 840 is held in place around the frame 800 by bands 820. This cover 840 forces water to be channeled vertically through the filtration media 801 supplying nutrients and oxygen to the microbes attached to the media. Launderers 500 may also be effectively used with this embodiment of the present invention. The cover 840 may be made of any material flexible or rigid that is corrosion resistant, has strength to resist any internal differential pressure and inhibits the flow of water and air through it. Although banding 820 is shown any effective fastening system may be used to hold the cover 840 against the frame 800.

Figure 18:
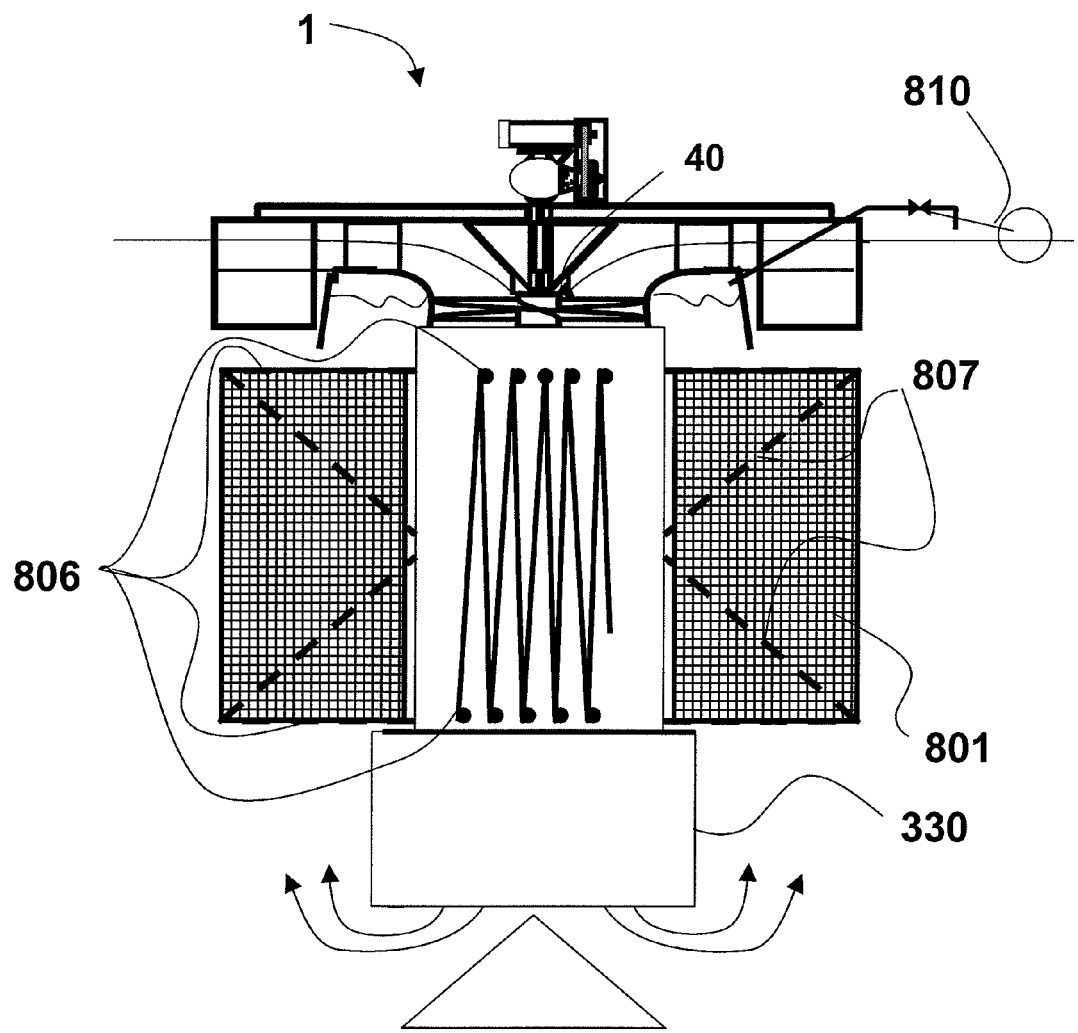
FIGS. 18-19 illustrate the mixer of FIG. 16 with varying arrangements of the filter media or biomass support according to one embodiment of the present invention.
Figure 19:
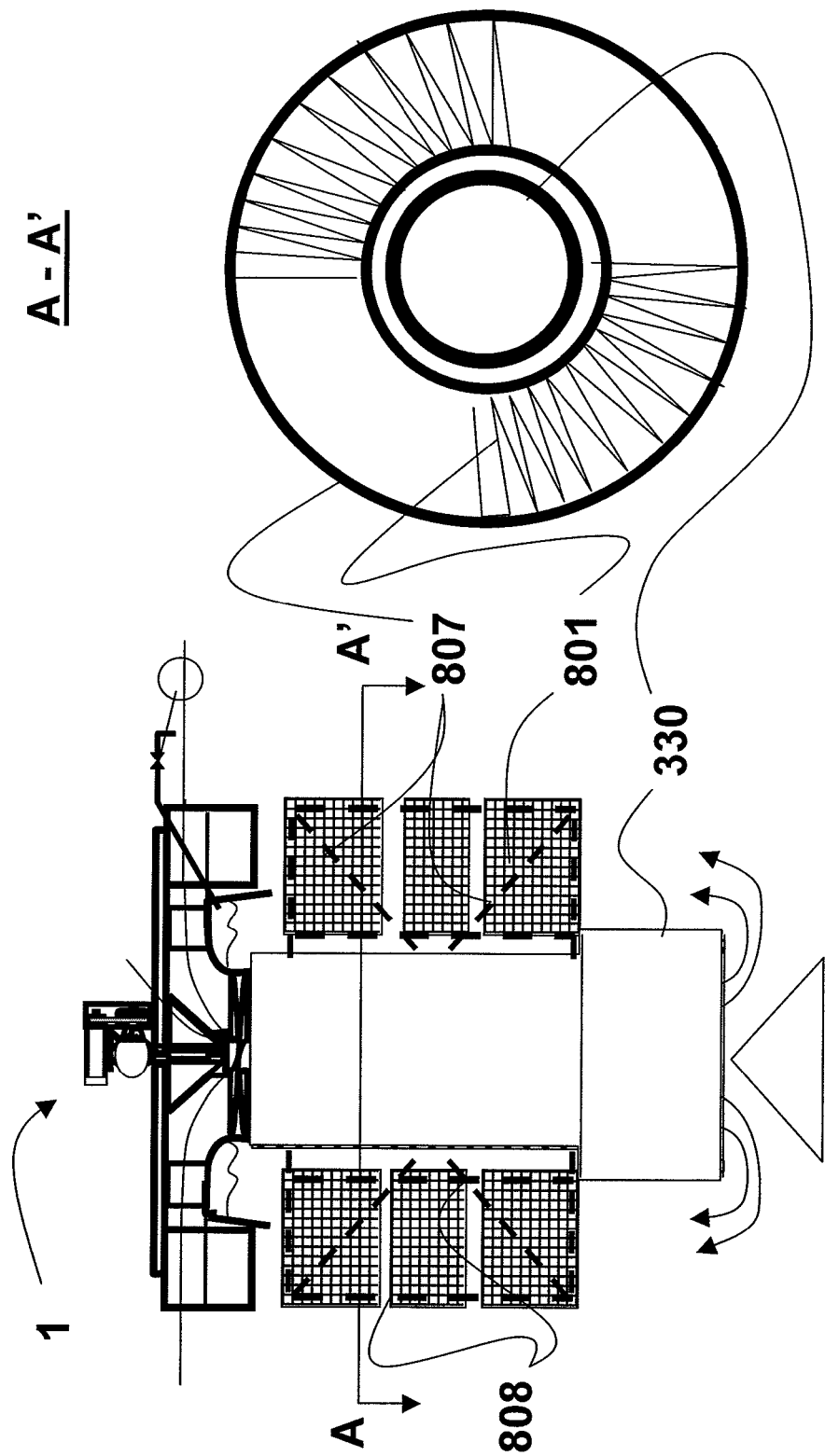
Figure 20:
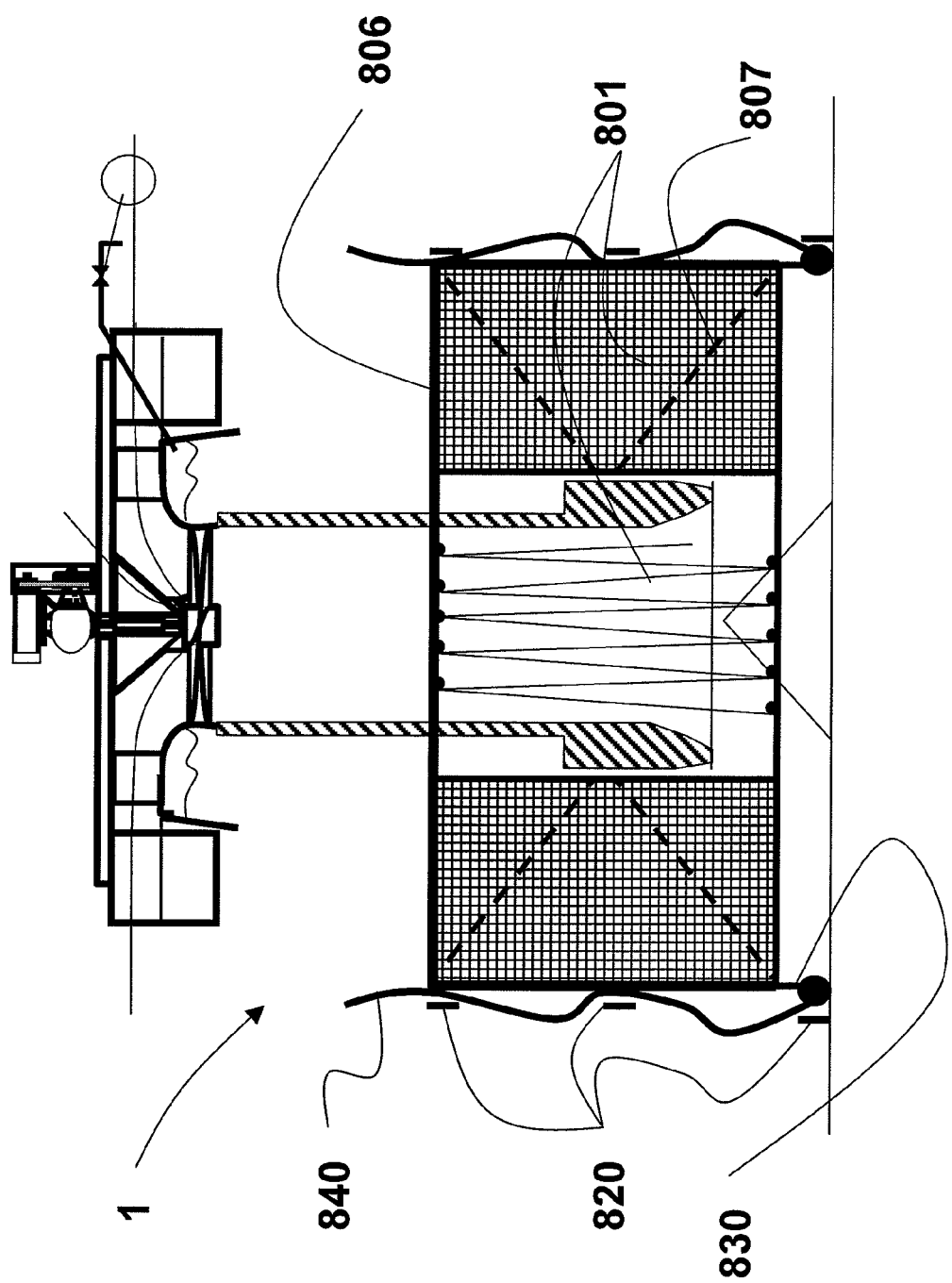
FIG. 20 illustrates a float supported drive, impeller and draft tube in combination with filter media or biomass support having an additional external cover.

In the embodiment shown in FIG. 18 a mixer 1 having a draft tube 330 and impeller 40 assembly also has a level control system 810 as described above. The draft tube 330 may have racks 806 protruding radially from its exterior. The racks 806 are arranged in pairs and have diagonal support braces 807 extending from the draft tube to an outer portion of the rack 806. The racks 806 are paired one top rack and one bottom rack. A fixed film media 801 is stretched tightly over the racks 806 and diagonal supports 807 in a zigzag fashion to force the area of liquid to pass between individual sheets of fixed film media 801 that are formed across the racks 806 and diagonal supports 807. The buoyancy of the draft tube will vary considerably with the fixed film media 801 attached. Level control 810 is included to counteract these effects. The fixed film media can be made of corrosion resistant material that is readily available from industrial sources. Many forms of pliable "geo-textiles" and permeable geological netting cloth, woven or non-woven, or membranes designed to hold earthen structures in place are effective low cost membrane materials. These are often made of polypropylene, a compound that stands up well to activated sludge and aerobic and anaerobic digester environments. In FIG. 20 the frames supporting the fixed film media 801 further includes vertical supports 808. The fixed film media 801 may be a geotextile, woven membrane, non-woven membrane or other membrane with enough texture to allow microorganisms to attach to the media.

In another embodiment shown in FIG. 20 racks 806 and diagonal supports 807 support fixed film media 801. The racks 806 are supported by a stand 803 resting on the vessel floor. A cover 840 may be held onto the sides of racks 806 by banding 820. The impeller and draft tube assembly is allowed to float independent of the racks 806 and diagonal supports 807 holding the fixed filter media 801.

Figure 21:
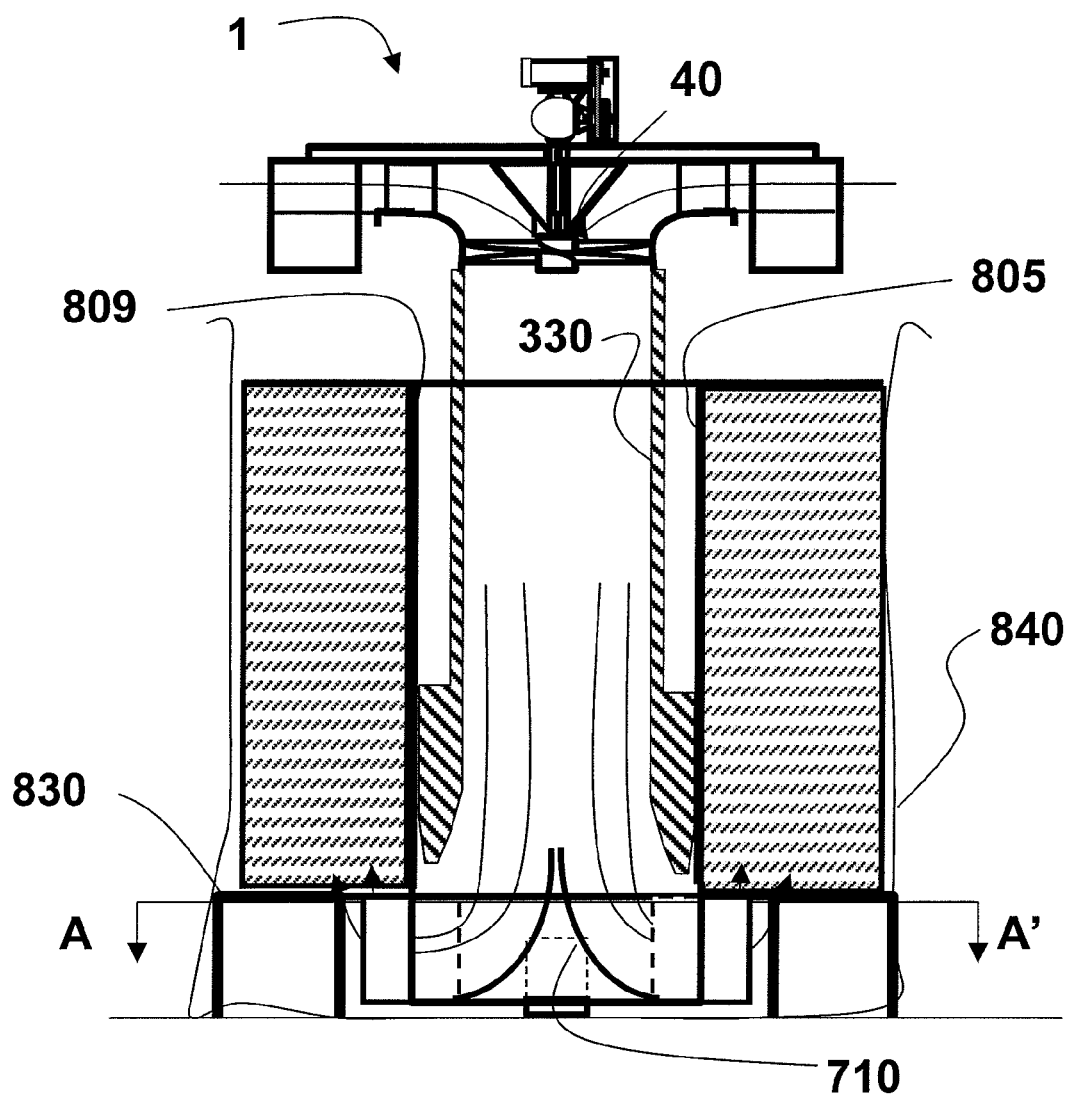
FIG. 21 illustrates a float supported drive, impeller and draft tube in combination with filter media and including a rotating flow diverter below the draft tube according to one embodiment of the present invention.

Referring now to FIG. 21, a mixer 1 is shown which is similar in many aspects to that of FIG. 17. However, FIG. 21 differs in that the embodiment shown includes a rotating flow diverter 710 and a second draft tube 809 affixed to the guide rails 805 and extending below the first draft tube 330 to a position at the top of the stand 830. The rotating flow diverter 710 divides the vertical flow into more than one stream and turns these to either a diagonally incline down or horizontal direction. The flow can be split into two or more streams. The total nozzle area of the flowing diverter may be equal to the area of the impeller. The flow diverter 710 may be attached directly to the draft tube 330 of a floating or stationary type. It can also be attached to a stand as shown in FIG. 21.

To reduce the stress, size and wear on the rotating flow diverter 710 each of the divided streams should deliver an equal an opposing hydrodynamic force to the diverter 710 so there is no net horizontal directional force on the rotating flow diverter 710. For example, for a two-stream flow the flow should be directed at 180° apart. The rotating flow diverter 710 can be used to concentrate all the flow in a strongly focused area or direction. This allows high volume directed liquid jets and gas flows providing a much higher floor velocity of pumped liquid in the area of the directed jets which reaches far from the discharge of the draft tube relative to a draft tube flow that is directed 360° radially out in all directions. The drive may rotate, for example, from once per second to once per hour. In one embodiment the flow diverter is indexed as opposed to continuously rotating. In another embodiment the flow diverting may be achieved by a series of gates that alternately open and shut.

The rotating flow diverter may be powered externally by a drive system between the rotating section and a stationary base or from a rotational floor force applied to the diverter face aimed from the forces applied to opposing helical extensions of the diverter faces. This will cause the pumped flow to apply a torque on equal but opposite faces of the flow diverter. Whether rotated by an external drive system or due to forces applied internally by the water flow the rotating flow diverter 710 preferably rotates on a bearing system that maintains its location relative to the draft tube. The rotating flow diverter 710 allows for effective scouring of either the floor of an aeration vessel or suspended media such as fixed film bioreactors or membrane filters placed in the path of the directed flow.

Figure 22:
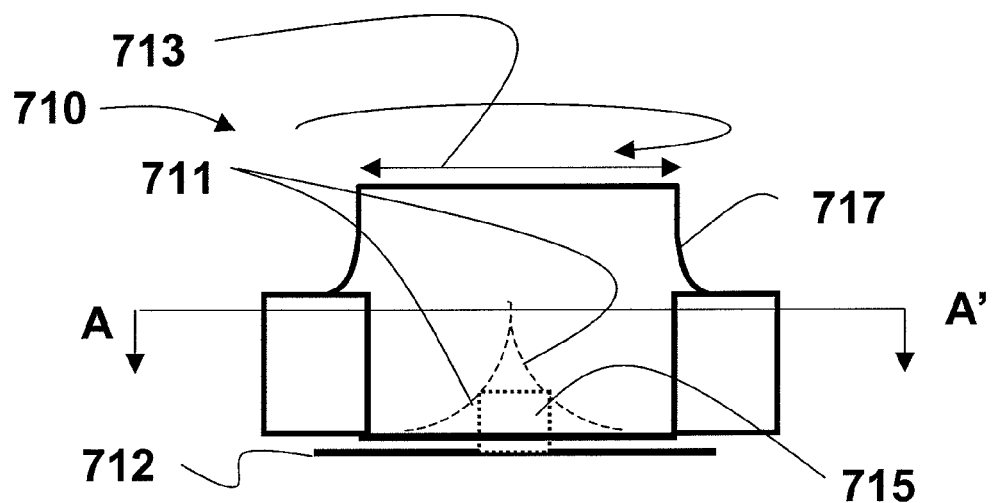
FIG. 22 illustrates a side view of one embodiment of a rotating flow diverter.
Figure 23:
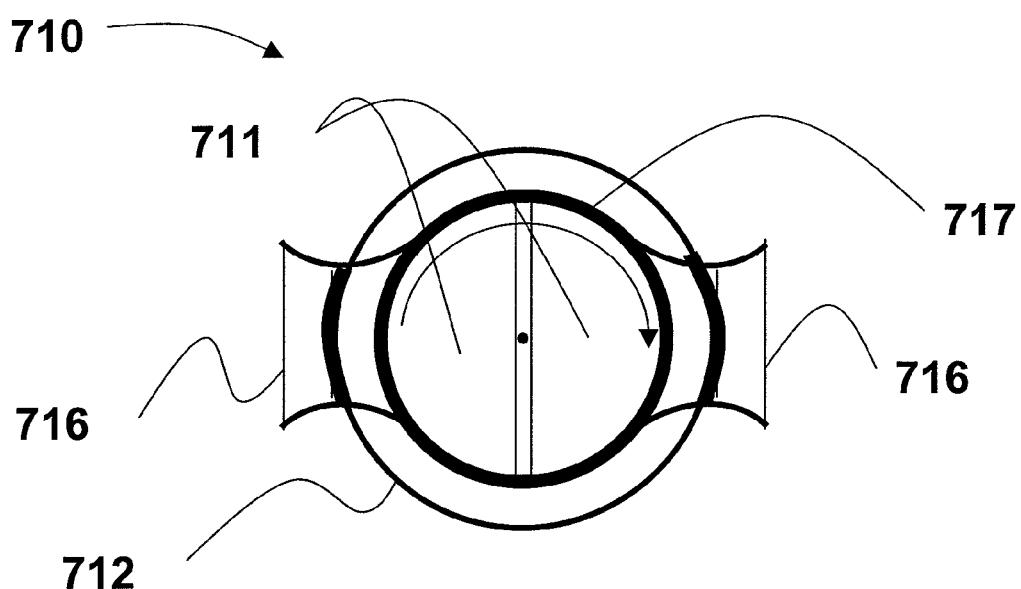
FIG. 23 is a plan view.

Referring now to FIGS. 22 and 23, an elevation and cross-section of one embodiment of a rotating flow diverter of a mixer 1 according to the present invention is shown. In this embodiment a two-nozzle diverter is described. The rotating flow nozzle 710 has two plough shaped faces 711 that smoothly divert the vertical flow to the horizontal flow. Exterior surfaces 717 of the flow diverter 710 are best constructed with radiused parts that form the nozzle to minimize turbulence prior to the jet leaving the diverter. The rotating flow diverter 710 may be mounted to the floor of an aeration vessel. Alternatively, the rotating draft tube may be elevated and affixed to the bottom of the draft tube whose base is not near the aeration vessel floor. In this embodiment the flow leaving the rotating flow diverter 710 will have a diagonal direction as opposed to a purely horizontal component. For flow diverters mounted directly to the draft tube by connecting the draft tube to a plate 712, the dimensions shown as 713 in FIG. 22 which is the outside diameter of the upper portion of the rotating flow diverter 710 will be in closed proximity to the inside diameter of the draft tube, for example, at least 95% of the inside diameter of the draft tube 330. The rotating flow diverter 710 may be an externally powered waterproof submersible gear motor 715. The submersible gear motor 715 becomes the center of rotation and applies torque between the rotating nozzle section and the base plate 712. The plough shaped faces 711 terminate with horizontally projecting nozzles which direct the flow of liquid outwardly.

Figure 24:
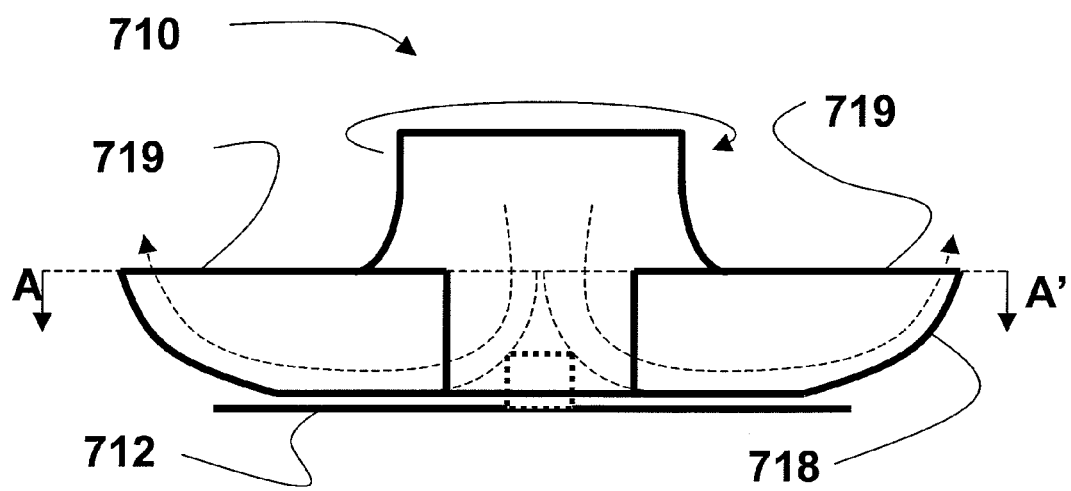
FIG. 24 illustrates a side view of another embodiment of a rotating flow diverter including upwardly facing nozzles according to one embodiment of the present invention.
Figure 25:
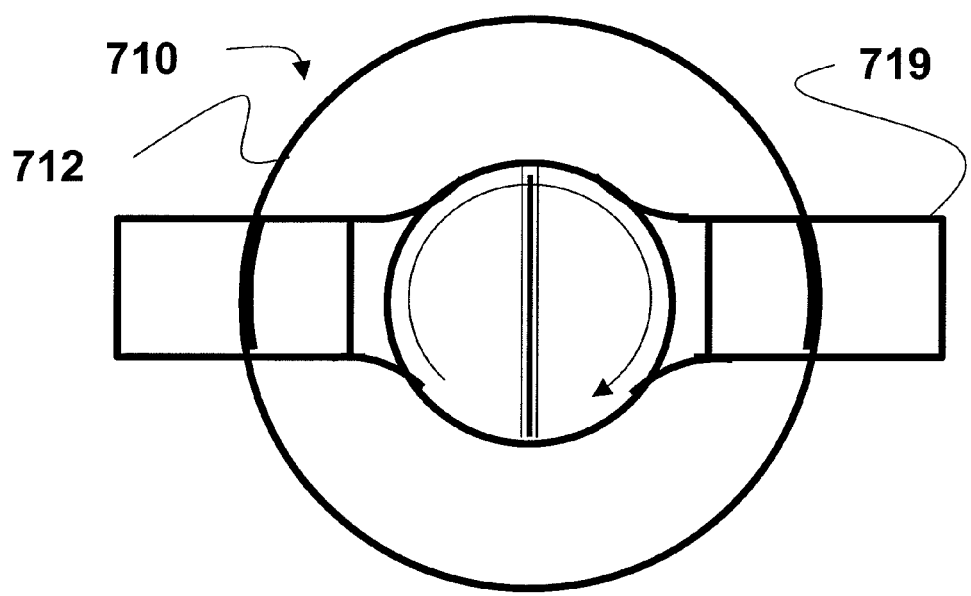
FIG. 25 is a plan view of the rotating flow diverter shown in FIG. 24.

Referring now to FIGS. 24 and 25, a rotating flow diverter 710 is shown with upwardly facing nozzles 719. In this embodiment the rotating flow diverter 710 has an additional upwardly curved wall 718 which redirects the flow liquid in an upward direction where it exits the nozzle 719. In this embodiment a base plate 712 design is valuable in using the flow of pumped fluid to clean and scour the surfaces of a filter media 801, as described above.

Figure 26:
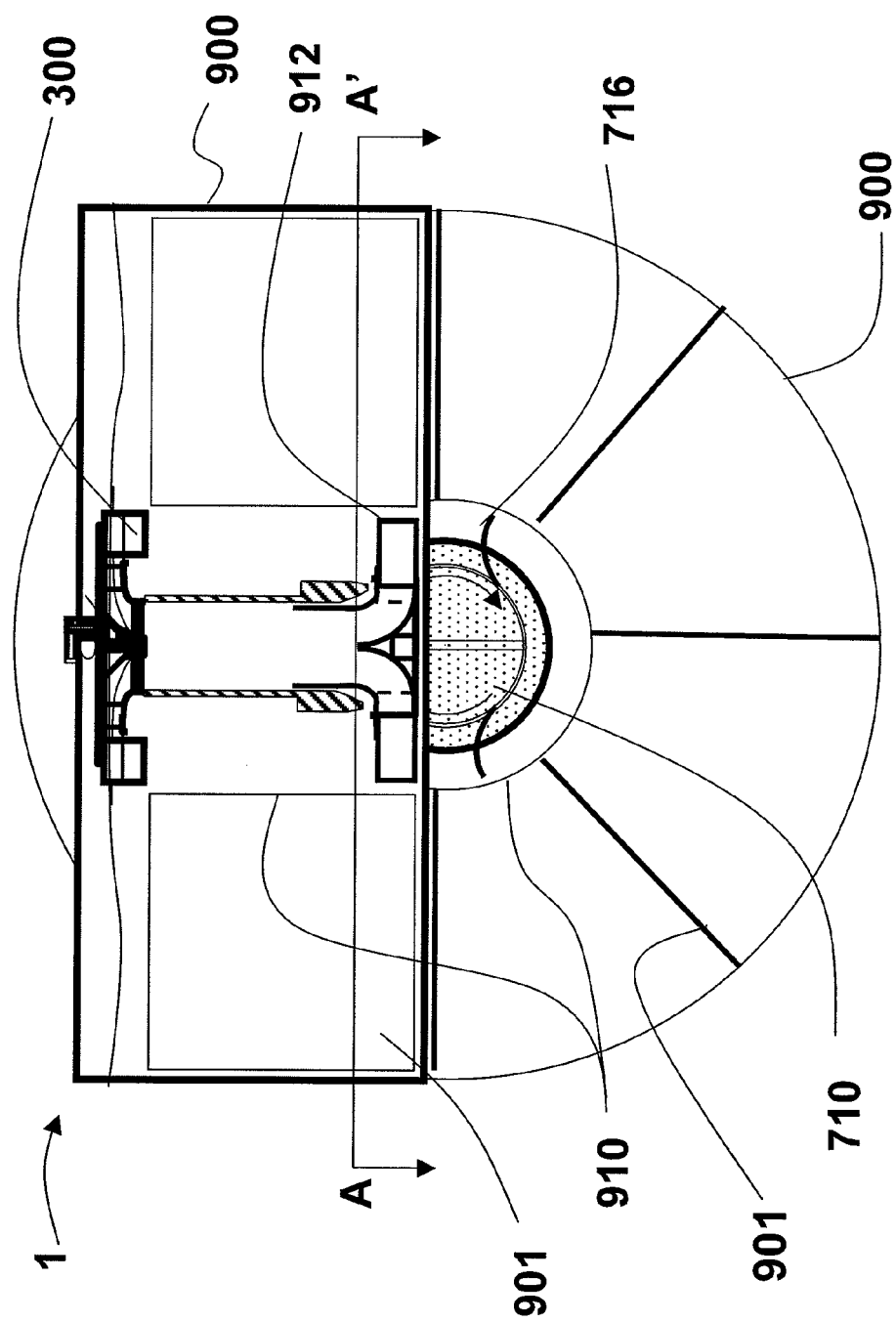
FIG. 26 includes a plan view and cross sectional view of a float supported impeller, drive and draft tube including a rotating flow diverter centrally positioned in a segmented containment vessel.

Shown in FIG. 26 is a mixer 1 with a segmented tank 900. For illustrative purposes, an elevation view and a section A-A' view are shown in the same figure. In this embodiment an impeller 40 and draft tube 330 assembly in conjunction with a flow diverter 710 are used inside a segmented aeration vessel referred to as a tank 900. The tank 900 has an interior cylindrical wall 910 and an exterior cylindrical wall 911 spanning between the interior and exterior cylindrical walls 910, 911 are dividing walls 901 which divide the tank into multiple pie shaped segments. A cylindrical baffle 912 is attached to the rotating flow diverter 710. The cylindrical baffle 912 has a diameter less than that of the path of nozzles 716 and is attached to the rotating flow diverter 710 and extending upwardly to a point adjacent to the bottom of the interior wall 910. The cylindrical baffle 912 prevents other sections from receiving directed flow from the nozzles 716.

The embodiment of the mixer system illustrated by FIG. 26 may be beneficial in systems requiring biological nitrogen removal. Some mixer systems may require settling prior to decanting fluid with low suspended solids. The impeller 40 may be mounted in a fixed position with its inlets having a diameter smaller than the diameter of the inner wall 910. All walls 910, 911, 901 are extended above the water level. Two openings are made in the cylindrical baffle 912 directly above its bottom openings to allow aerated activated fluid to flow out the sections or chambers being fed by nozzles 716. In this manner, the sections not fed by the nozzle 716 may settle and be decanted.

Figure 27:
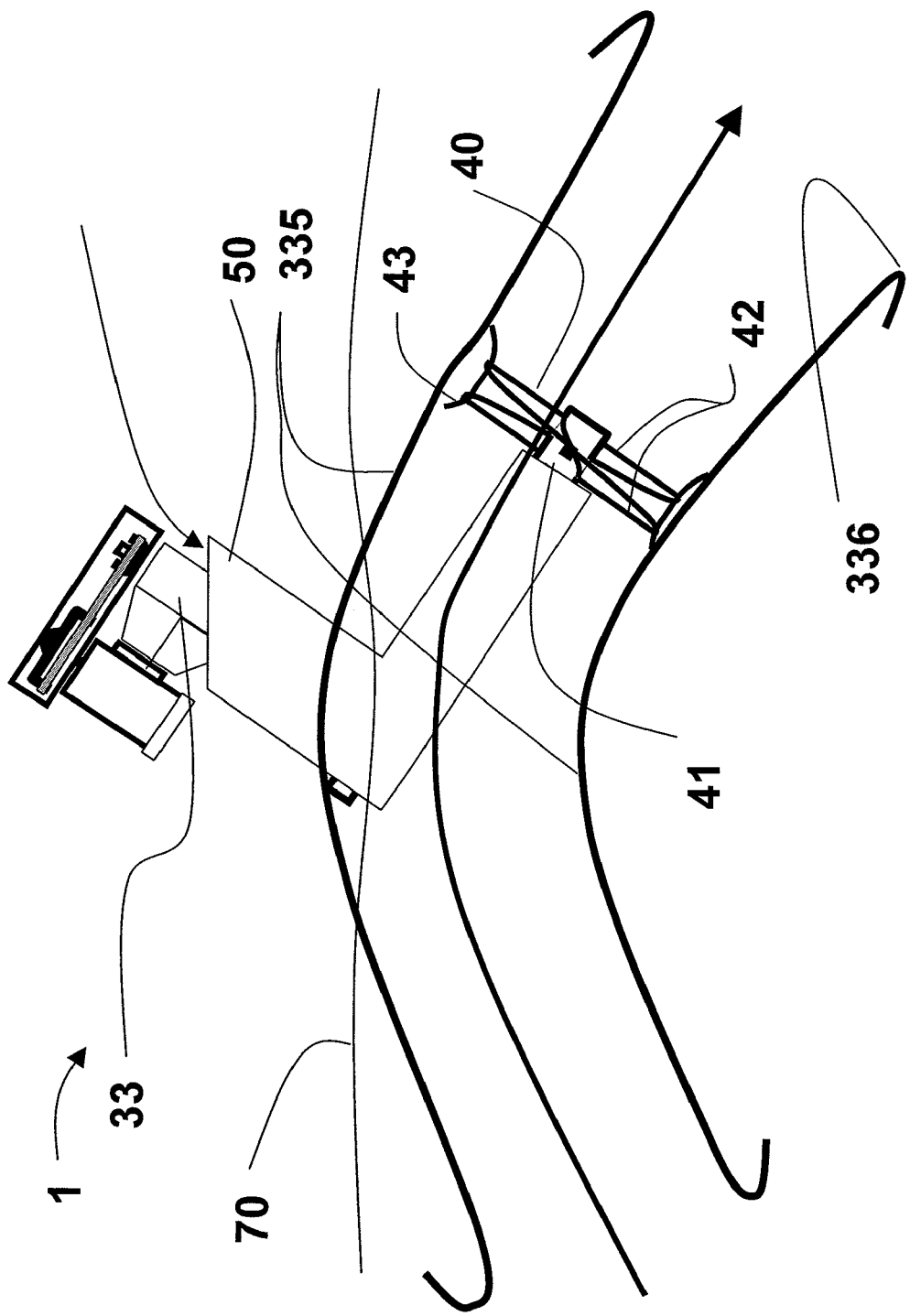
FIG. 27 illustrates a drive, impeller and flow tube positioned at an angle relative to the liquid surface according to one embodiment of the present invention.

As seen in FIG. 27 the impeller 40 and draft tube 330 do not always need to be oriented in a vertical position. In this embodiment the impeller 40, gear box 30 and motor 10 are angled with respect the fluid surface. The driven shaft may be oriented at an angle of less than 90 degrees with respect to the fluid surface. The impeller 40 is located inside a flow tube 335. The flow tube 335 acts as a draft tube to direct flow through the outlet 336 and also acts as an inlet duct by delivering fluid to the impeller. In this embodiment, the gas conduit 50 is in the form of a shroud. The air is drawn through gas conduit 50 by the low pressure created by impeller 40. The flow tube 335 is designed to increase the directional flow of this mixer 1, prevent the aspirating of air from directly above the impeller at the liquid surface and draw upstream water from below the liquid surface to the inlet of the flow tube 335. Although not shown, multiple turning vanes may be installed upstream of the impeller 40 so the desired pre-rotation counter to the rotation of the impeller is achieved. The impeller 40 has a ring 43 attached to an outer portion of the blades 42. The ring 43 is used to stabilize the outside of the impeller blades 42. In applications where a flow tube 335 or draft tube 330 are not used the ring 43 helps restrict the flow of fluid to only axial flow eliminating radial flow from the blades 42.

The outlet 336 of the flow tube may be extended to within 0.25-1 meter of the aeration vessel. The outlet may be enlarged and deformed, creating a slot jet with a rectangular floor opening having the same area as the area of the flow tube in the vicinity of impeller 40. The slot jet is effective at aerating racetrack and lagoon type aeration systems. The jet of aerated water gives lateral energy to the water around it, conveying the water in racetrack channel around the track. The air bubbles formed subsurface have a much longer path/retention time in water than those formed by paddle wheel type aerators due to their formation near the surface and discharge below the surface or near the floor. Flow tube 335 should be made of corrosion resistant material and should be supported to take the slight negative pressure upstream of the impeller 40 and the slight positive pressure downstream from impeller 40.

Figure 28:
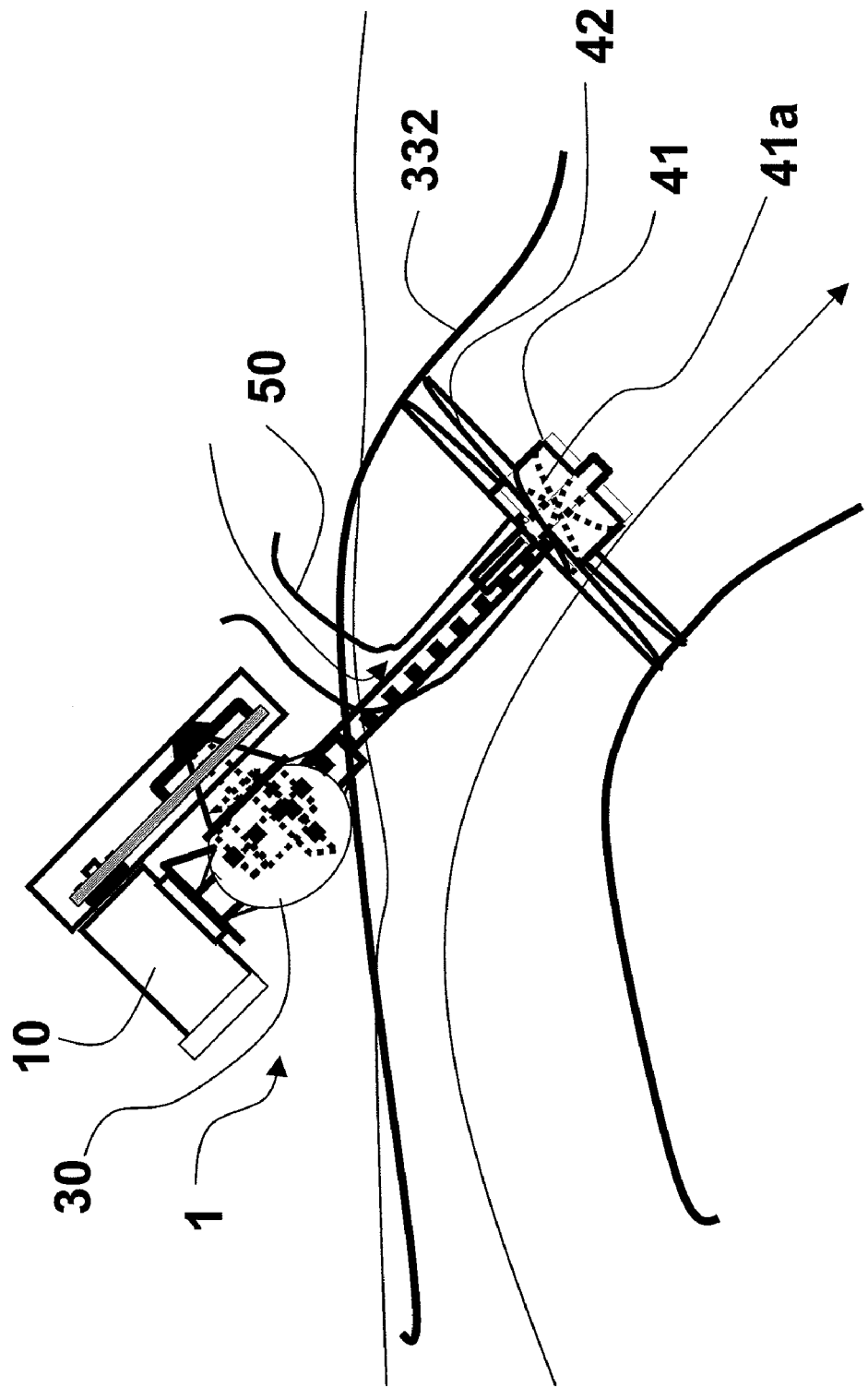
FIG. 28 illustrates a drive, impeller and draft tube arranged at an angle relative to the surface of the liquid according to one embodiment of the present invention.

Referring now to FIG. 28, a mixer having a straight driven shaft is shown. Gear box 30 and impeller 40 are set at an angle relative to the fluid 70 level and impeller 40 is positioned within a flow tube 332. The gear box 30, motor 10 and gas vent 50 all extend above the liquid. The impeller 40 in this embodiment has a first set of blades 42 and an impeller hub 41. The impeller hub 41 additionally has a second set of blades 41a set a larger pitch ratio than the first set of blades 42. This configuration is beneficial when the depth of the impeller 40 is too deep to allow the lower pitch ratio of impeller blades 42 to aspirate air. The larger pitch ratio of impeller blades will create a small volume of high velocity liquid which creates lower pressure at the point of gas aspiration. This creates higher axial velocities at the center for a small portion of the pump flow. If this is not desirable or a higher pitch ratio blades 41a is insufficient to overcome the pressure required to aspirate at a given depth, a booster blower may be installed in gas conduit 50.

Figure 29:
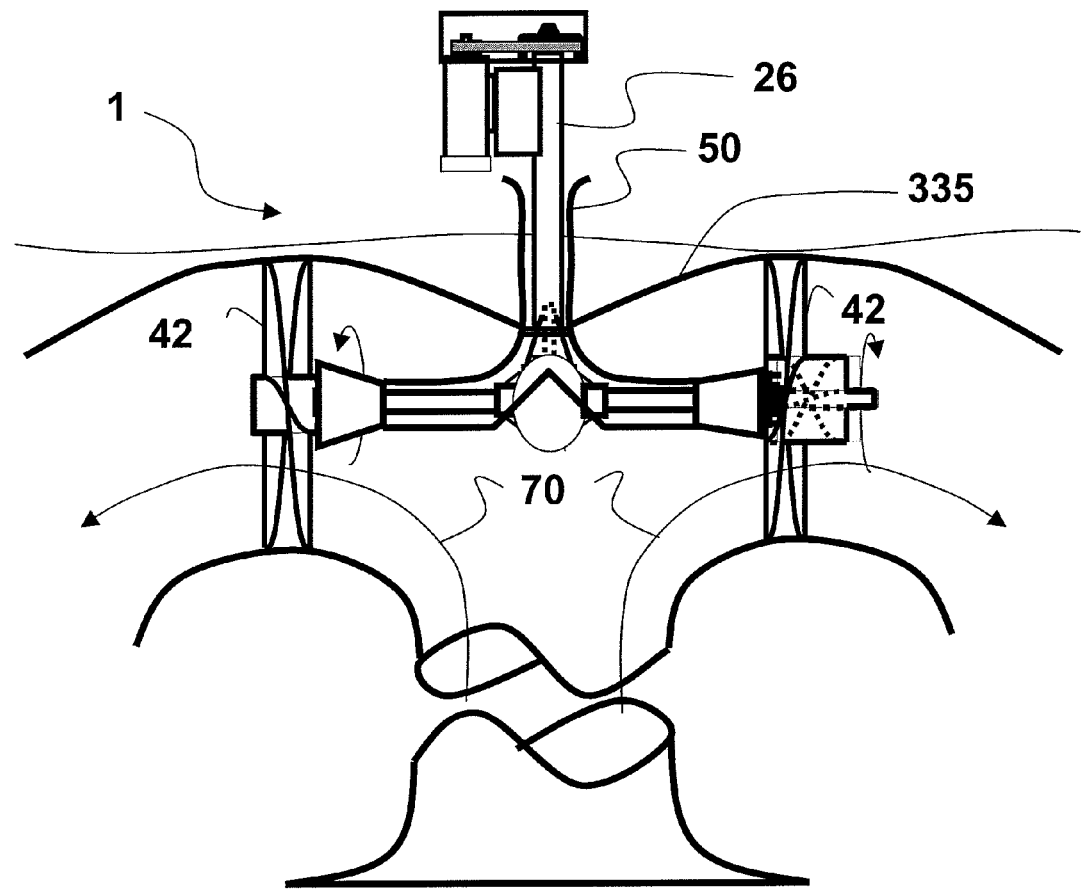
FIG. 29 illustrates a mixer having multiple impellers, a gas conduit, a drive and a draft tube having a vertical inlet and two horizontal outlets.

Referring now to FIG. 29, a two impeller 40 system having a vertical drive shaft transitioning to two horizontal driven shafts by way of a submersible gear box. Gas vent 50 extends along the drive shaft and driven shafts to a location proximal to the impeller blades 42. As described above, the impeller hub 41 may have second impeller blades 41a with a higher pitch ratio than those of impeller blades 42. Impellers 40 draw fluid through a flow tube 335 having an inlet that directs fluid from either deep in the aeration tank or from upstream in a racetrack design. The fluid is directed out and away from the impellers 40 in a downward direction in a vessel design and upstream if in a racetrack or directed flow application.

Figure 30:
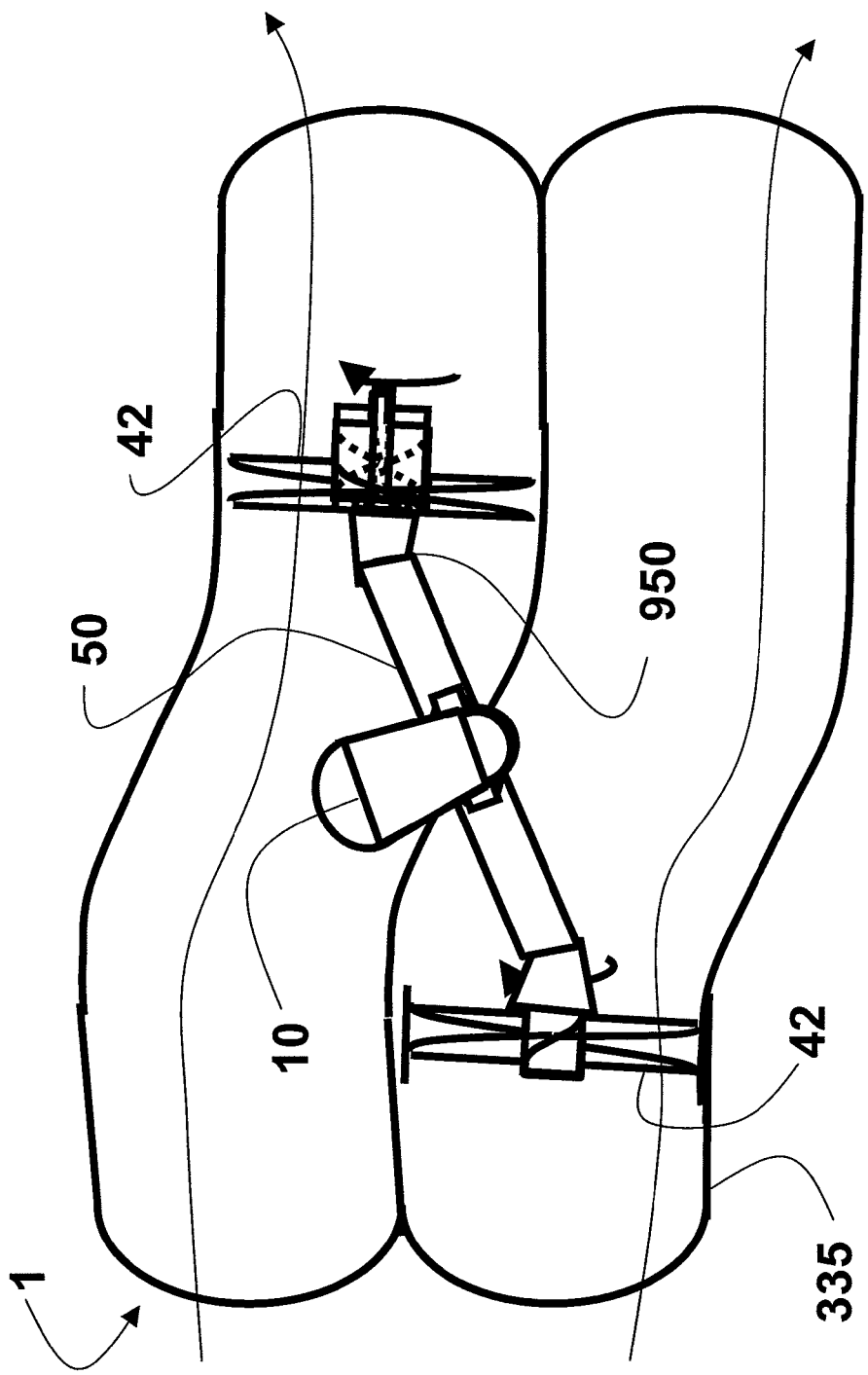
FIG. 30 illustrates a two impeller mixer having constant velocity joints between the shafts and impellers, so impeller direction may be adjusted according to one embodiment of the present invention.

Referring now to FIG. 30, a mixer 1 is shown from the top. The drive system is substantially similar to other embodiments described above. However, the driven axles end with constant velocity joints 950 which drive the output hubs 34a, 34b (not shown). The constant velocity joints are held in a fixed position by way of a bracket mounted to the hub. This configuration allows two smaller diameter impeller to be placed in a parallel pumping arrangement through two parallel flow tubes 335 and may be used in racetrack design aeration tanks. The benefit of having two smaller impellers 40 as opposed to one large impeller is that the gas conduit 50 and impeller hub 41 are located at a shallower depth than would be required with a larger impeller 40.

Figure 31:
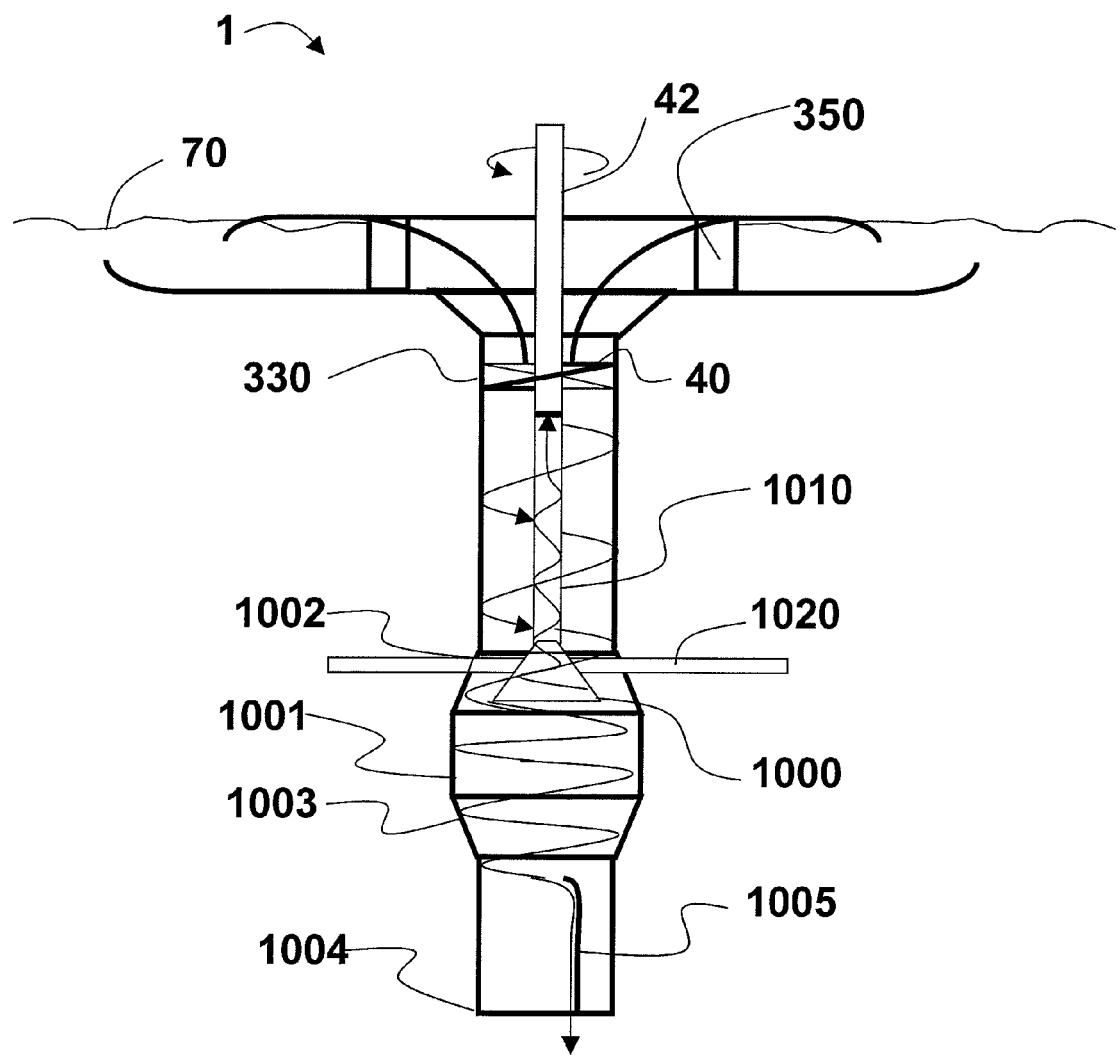
FIG. 31 illustrates a mixer having a gas recycle system including an expanded section of the draft tube in a collector for delivering undisolved gas back to the impeller or exhausting the undisolved gas back to the body of the liquid according to one embodiment of the present invention.

FIG. 31 represents a mixer 1 and draft tube 330 configuration designed to remove gas entrained in the liquid 70 at some depth below the impeller. This embodiment of the present invention demonstrates a design useful for either recycling valuable gas which is undisolved in the flow of liquid within the draft tube removing the undisolved through the sides of the draft tube 330 if it is air. There are obvious benefits to recycling expensive gases like high purity oxygen as opposed to discharging the undisolved gas into the atmosphere. If the system is utilizing air the benefit provided by this embodiment of the present invention allows the back pressure created by the buoyancy of the undisolved gas within the draft tube to be reduced and allows much deeper pumping of liquids 70. This is particularly effective at aerating and mixing tanks at for example, 20-70 ft deep. The present invention eliminates the high costs of using compressed gas.

As can be seen in FIG. 31 a modified draft tube 330 is used. Draft tube 330 has an enlarged diameter section 1001 including transition segments 1002, 1003 transition segment 1002 begins at a depth below water 70 level of, for example, 2-5 meters. The diameter of the enlarged diameter section 1001 is, for example, 1.3-2 times the diameter of the remainder of draft tube 330. Transition segment 1003 reduces the draft tube 330 back to its original diameter at outlet 1004. The fluid 70 within the draft tube 330 has a rotation established by inlet turning vanes 350 and impeller 40. Speed straightening vanes are placed in the interior of the outlet 1004 to counter this rotation and direct the liquid 70 downward.

As mentioned above the liquid 70 is moving in a rotating or helical fashion through draft tube 330. This helical path of the gassed liquid tends to concentrate denser low gas content liquid near the walls of the draft tube and lower density high content gas liquid near the center of the draft tube 330. The gassed liquid enters the enlarged diameter section 1001 through transition segment 1002 its axial velocity is reduced between, for example, 25% and 70%. As a result of this reduction in axial velocity gas is disengaged and driven to the center of the rotating liquid. A collector 1000 is positioned in the center of transition segment 1002 to collect this disengaged gas. The collector 1000 may be made from many shapes and is shown here as a truncated conical section. If it is desirable to recycle the gas the collector 1000 is in communication with a tube 1010 which delivers gassed liquid to a low pressure area on impeller 40. The tube 1010 fits inside of rotating impeller hub 42. If the collector 1000 is gathering air with depleted oxygen the air would not be recycled, the low oxygen air may be routed from the collector 1000 out of the draft tube 330 via ducts 1020. The ducts 1020 can distribute the collected gas into the water adjacent the draft tube 330 through a series of coarse bubble diffusers, manifolded two pump driven jet aerators or into a series of coarse bubble diffusers located below fixed film media or for cleaning membrane surfaces. The ducts 1020 may also return the gas if desired to an area adjacent the impeller 40.

The collector 1000, tube 1010 and/or duct 1020 may be supported from the inner walls of the draft tubes 330 by radial struts shaped to minimize flow disruption having their flat sides inclined in the direction of helical flow of the liquid 70.

Figure 32:
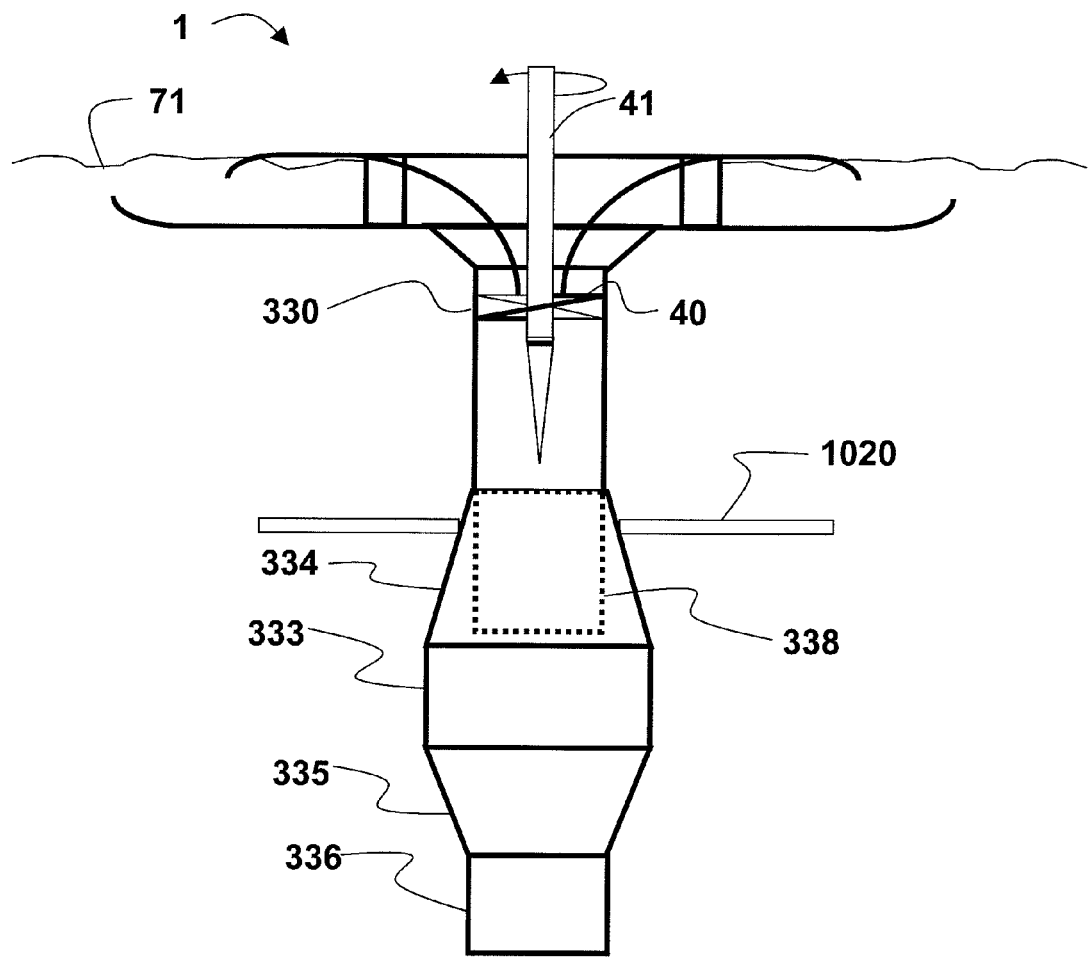
FIG. 32 illustrates a mixer with a gas recycle system including an expanded section of the draft tube for ducting undisolved gas back to the body of the liquid.

Referring now to FIG. 32, another embodiment of the present invention is shown having an expanded diameter section 1001 of a draft tube 330. In this embodiment draft tube 330 has an extension segment having the same diameter as the upper portion of draft tube 330. The extension 338 extends into transition segment 1002. Again a rapid slowing of axial velocity of the fluid in the expanded diameter segment 1001 cause disengagement and coalesce of undisolved gas in the liquid 70 which gathers in transition segment 1002 in areas external to extension 338. This trapped gas rises and is evacuated through ducts 1020.

Figure 33:
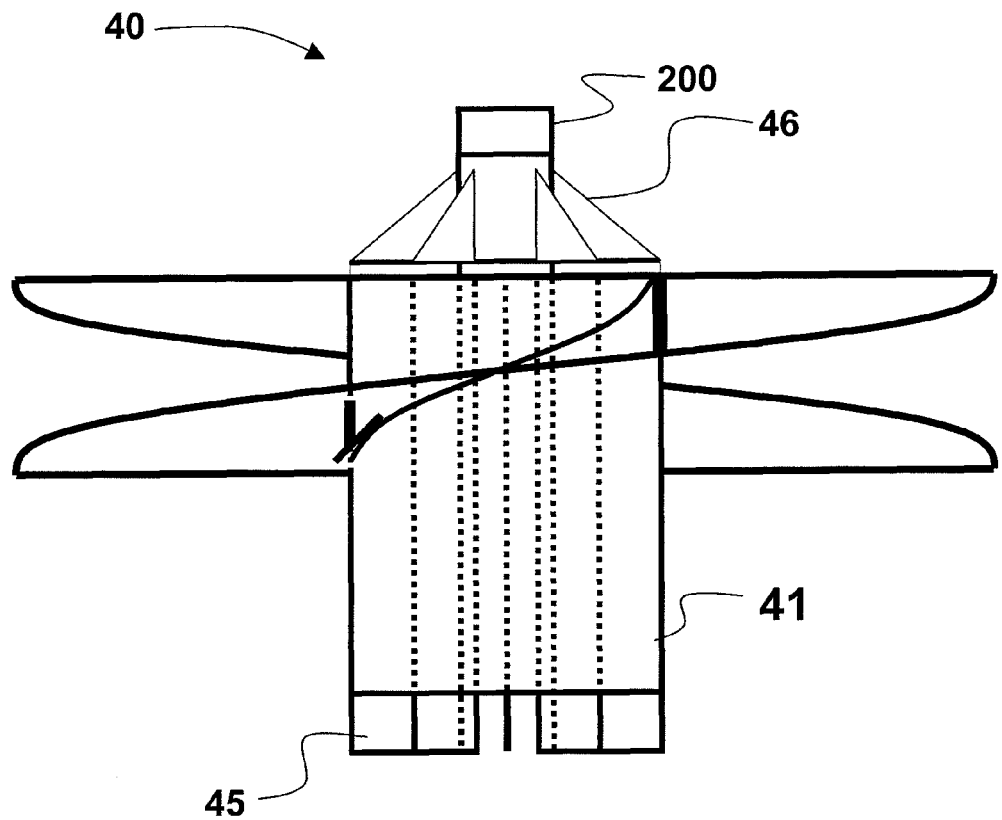
FIG. 33 illustrates an impeller having an opened hub connected to the driven shaft by internal baffles which allow undisolved gas to pass back through the impeller according to one embodiment of the present invention.
Figure 34:
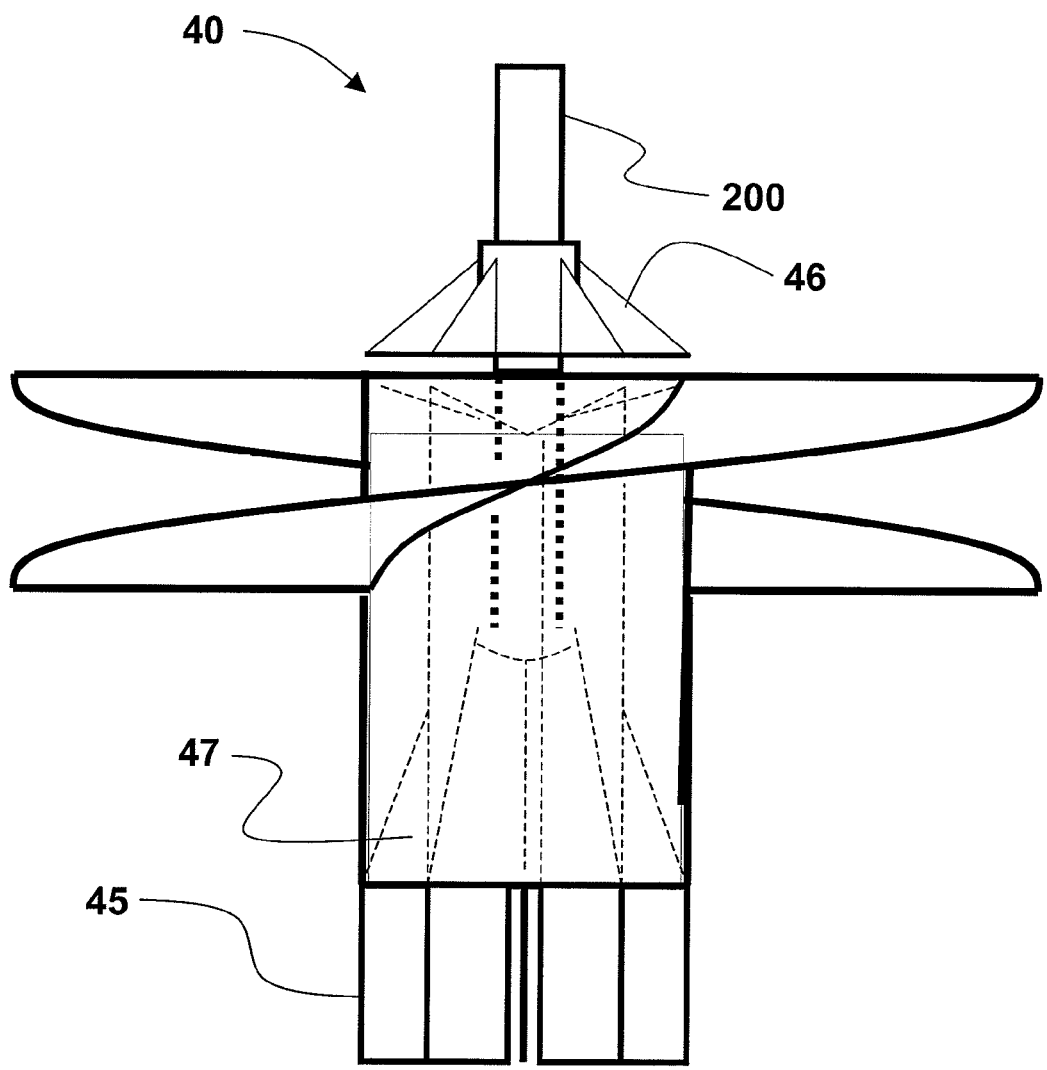
FIG. 34 illustrates an impeller with an open hub connected to a driven shaft by baffles and conical sections which allow gas to pass from the outlet side to the inlet side of the impeller according to one embodiment of the present invention.

Referring now to FIG. 33, an impeller 40 with a cylindrical hub opened at the top and bottom is shown. A portion of the driven shaft 200 is shown. The driven shaft 200 is connected to the impeller hub 41 by internal baffles 45 that may be welded both on the inside of the cylinder and to the shaft. The number of baffles depends on the diameter of impeller hub 41 with larger hubs receiving more baffles. In this embodiment larger gas bubbles may enter from below the impeller and rise through the hub and be returned to the low pressure side of the impeller 40 to be reincorporated into the liquid stream. Liquid starting to pass through the base of the impeller 40 with the gas will tend to be expelled by the radial forces applied to a heavier fluid by the internal baffles. This impeller 40 is beneficial when a high purity gas is used. The amount of gas recycled can be regulated by raising or lowering a restrictor plate 46 located on the top of the impeller hub 41. In another embodiment shown in FIG. 34 addition internal conical sections 47 are welded between the internal baffles 45. The internal conical sections 47 aid in expelling liquids that are carried up with the gas liberated below the impeller 40. a combination of the conical sections 47 shown in FIG. 34 may be shaped like an upwardly narrowing frustum.

Figure 35:
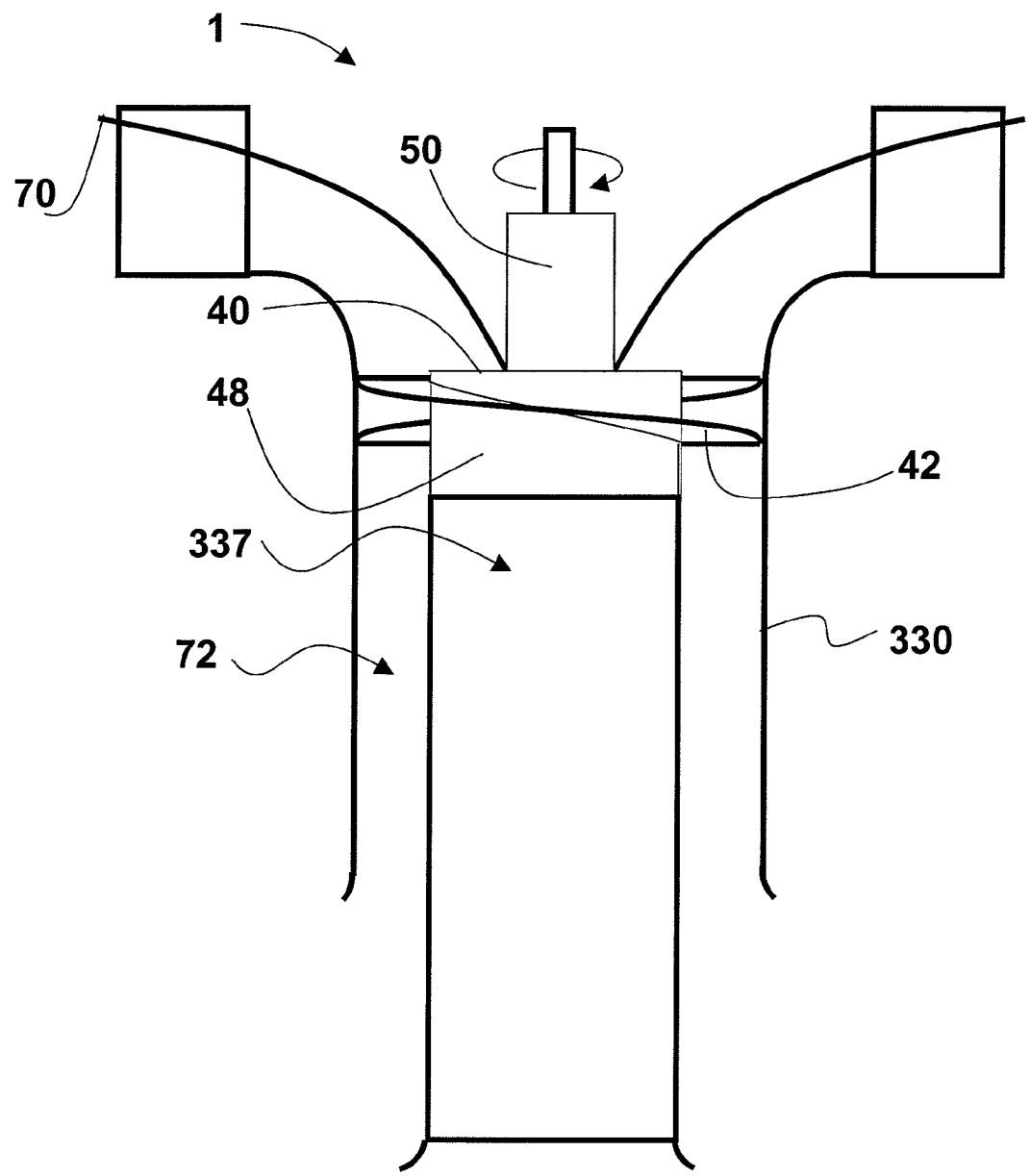
FIG. 35 illustrates a mixer having two draft tubes where gas and liquid are mixed by the impeller in the interior draft tube and liquid only is conveyed through the exterior draft tube.

Referring now to FIG. 35 a mixer 1 with a second draft tube 337 inside of a first draft tube 330 is shown. Impeller 40 is in communication with gas vent 50 to aerate gas into the pumped liquid. In this embodiment impeller 40 additionally has a cuff 48 mounted on the impeller blades at a radius of about 70% of the overall radius of the impeller. The second draft tube 337 is mounted directly below the cuff 48 to capture the discharge of the impeller 40 inside of the cuff 48. This volume of liquid 70 is gassed. The area of the impeller 40 external to the cuff 48 is not in communication with the gas vent 50 and therefore pumps only liquid. This provides a higher density annular stream of liquid in the area between the first draft tube 330 and the second tube 337. The annular stream of high density liquid envelopes the internal column of gas filled liquid exiting the second draft tube 337 and pushing the gas filled liquid deeper and radially outward larger distances than would be achieved if the gas stream alone were discharged. The incremental cost of pumping the ungassed liquid at a small velocity, for example, 3-5 feet per second is small and serves a beneficial purpose for tank mixing and aeration.

Figure 36:
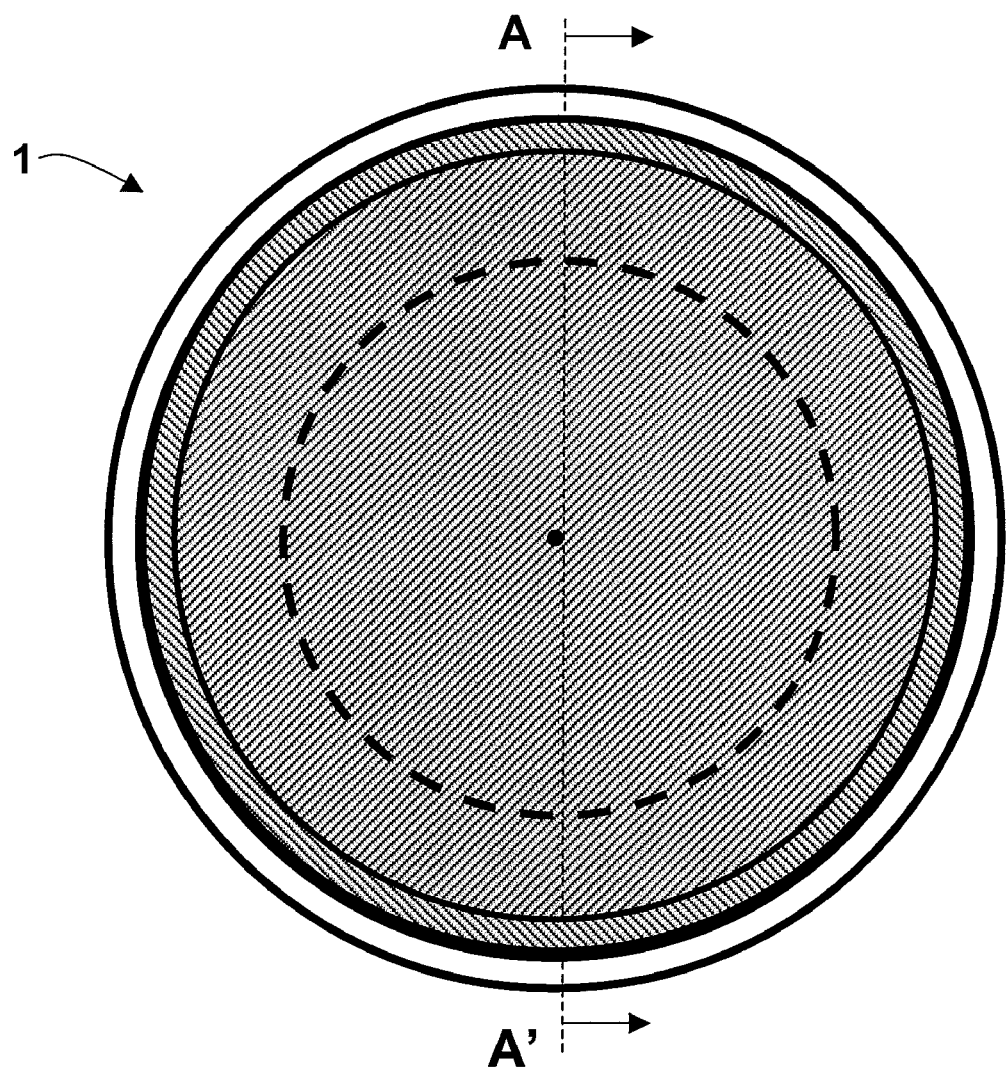
FIG. 36 illustrates a mixer having two draft tubes where the impeller is incorporated into a float according to one embodiment of the present invention.
Figure 37:
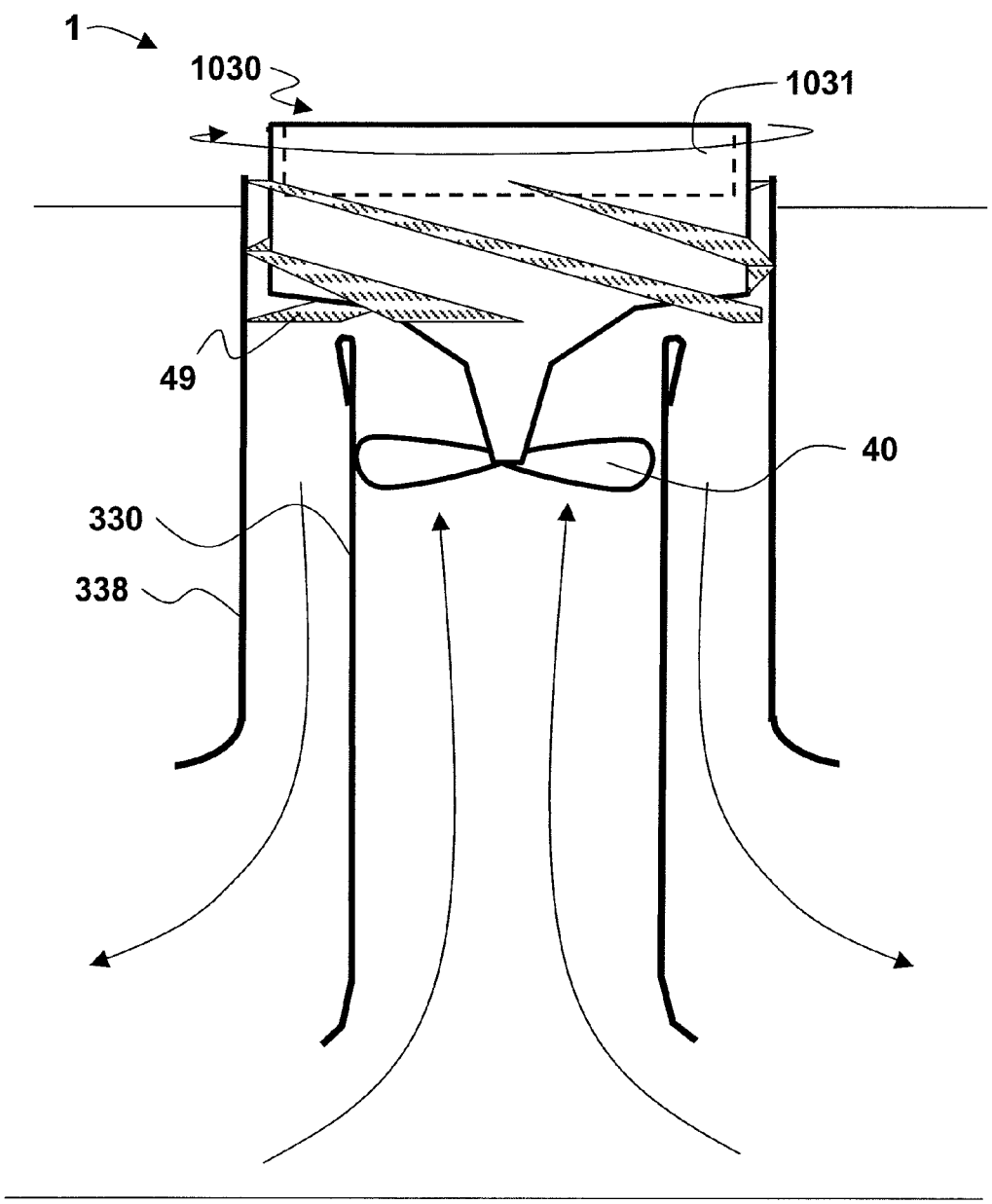
FIGS. 37-38 illustrates a mixer having two draft tubes and an impeller incorporated into a float according to one embodiment of the present invention.
Figure 38:
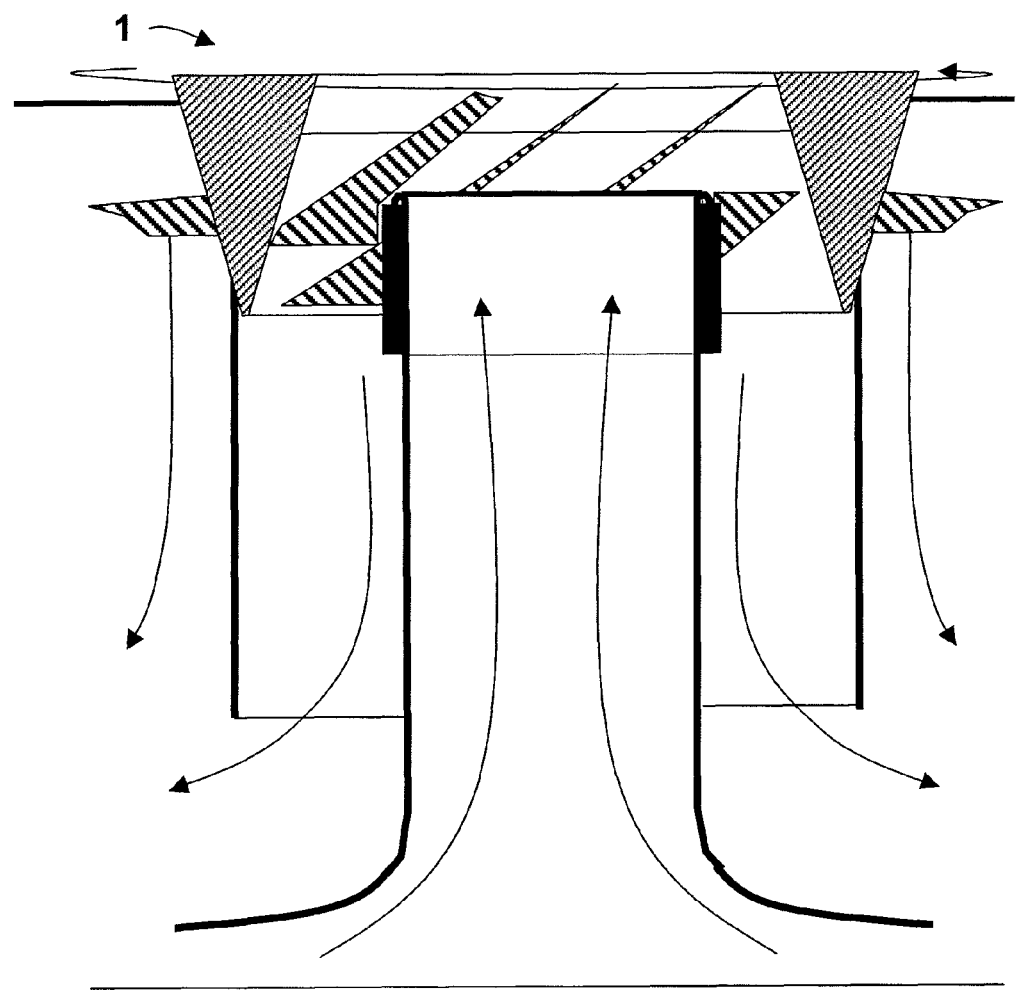

Referring now to FIGS. 36 and 37, a floating impeller 40 is shown. In this embodiment an option impeller 40 is positioned inside of draft tube 330 and configured to pump liquid in an upward direction. Axial or mixed flow blades 49 are configured to receive the fluid from inner draft tube 330 from optional impeller 40 and directed outward to be aerated and pumped down through a second draft tube 338. The floats 1030 may be made of metal reinforced plastics or any suitable material that will support the stresses applied to the float by the blades, resist corrosion and can be formed to contain hollow cavities 1031 that are filled with foam and/or cavities that are filled and emptied with fluid or the ability to fill and release fluid from the floats 1030.

The liquid is added to the cavities 1031 located above the normal waterline of the float by several scoops either open launderers or tubular sections that have an opening pointed in the direction of rotation. As the rotation increases on start-up liquid is jetted up the scoops to the elevated reservoirs until enough weight is added to the elevated cavities to maintain the blades of the impeller at their desired pumping position. Once this has occurred and the ballast is at the correct weight either the scoops are lifted from their submerged position, closed, or rotated so that the flow of liquid is interrupted or a valve is opened in the elevated cavities that allows the water to escape as fast as it enters. The control devices are known to those skilled in the art. One simple one is a trailing weighted float or small wing section that rides on the water's surface. If the float is too high the arm falls allowing the reservoir to fill. If it is too low the arm empties the reservoir.

The float is held in position about its rotational axis by either a central shaft and bearing or by low friction guides placed about internal or external cylindrical sections. These low friction guides can stationary rub block bearings or rotating low friction material lubricated by the fluid.

The drive may be located at the center of rotation for example a gear reducer and motor especially in-line drives like planetary gearboxes that do not impart an overhung load on the floating impeller. If an overhung or off centered load is applied to the impeller a counter weight can off set this. The counterweight can be made by locating a cavity sufficiently large to hold enough fluid weight above the liquid surface relative to the distance it is located from the off-centered weight to balance the load. Once the floating impeller is in place this cavity can be filled and sealed.

Alternatively, a friction drive can be applied to a large diameter drive ring best located above the liquid or splash wetted zones can make a very low cost drive. Friction between a wheel in contact with the inner, outer or both surfaces of the drive ring can cause the floating impeller to rotated. Large forces can be applied to the drive ring if one or more idler wheels are placed on the opposite side of the driven ring and are mechanically supported by the drive. Drive friction may be increased by applying elastomeric compounds to the drive wheel or wheels and by increasing the contact surface by using inflatable tires on the drive wheels. Idler wheels located about the driven ring can be used to locate the floating impeller in the proper special position wherein it rotates. The driven ring must be tall enough to handle any change in elevation due to changes in thrust if the drive wheels and drive are mounted on a fixed mount as opposed to being suspended from the float itself. Drives mounted and supported by the rotating float may need to have supports from a non-rotating part of the drive to a stationary object for the torque of the drive to act against. These may be rigid torque arms protruding radially from the drive connected to cables tied off on stationary objects.

Large floating impellers may also be driven by these large diameter friction drives by means of a belt of cable drive. The drive and motor located on a stationary platform or on shore while one of more floating impellers are strategically located in the aeration basin about a fixed rotational point. The long cable or belt is strung in a serpentine fashion around the drive rings and back to the drive which in this case would be mounted to a cable or tensioner. The impeller drive rings in this case could be further protected of they were clad with an elastomeric wear resistant material that would both protect the drive ring material and improve the friction between the drive cable or belts. The drive ring material may be fiber reinforced plastic, metal or other material. The drive ring can also have attached to it elastomeric or non-elastomeric material fastened to it that has groves cast or cut into it. These grooves can be either chevron shaped or straight slots parallel or perpendicular to the axis of rotation. The wheel of the drive then can have teeth cut into it that fit into the grooves found in the drive ring. The drive teeth can be made of hard plastic or metal.

Whereas particular embodiments of this invention have been described above for purposes of illustration, it will be evident to those skilled in the art that numerous variations of the details of the present invention may be made without departing from the invention as defined in the appended claims.

The invention claimed is:

1. An apparatus for mixing gas and liquid comprising:
    at least one impeller structured and arranged for submersion in the liquid, wherein the at least one impeller is rotatable at an angular velocity and generates an axial velocity of the liquid; and
    a draft tube around the impeller comprising an upper portion, a lower portion and a center portion with a larger diameter than the diameter of the upper portion and lower portion, and a collector structured and arranged inside the center portion of the draft tube to collect undissolved gas,
    wherein the collector is in communication with a cylinder concentrically located with the draft tube, the cylinder extending from the collector through the hub of the impeller to an elevation adjacent the inlet side of the impeller.

2. An apparatus for mixing gas and liquid according to claim 1 wherein the diameter of the center portion is 1.3 to 2 times larger than the diameter of the upper portion and lower portion.

3. An apparatus for mixing gas and liquid according to claim 1, wherein the collector is in communication at least one duct extending from the collector to a location external to the draft tube.

4. An apparatus for mixing gas and liquid according to claim 1 further comprising at least one duct extending horizontally from the top segment of the center portion of the draft tube, wherein the upper portion extends into the top segment of the center portion.

* * * * *